US010346819B2

(12) United States Patent
Stock et al.

(10) Patent No.: US 10,346,819 B2
(45) Date of Patent: Jul. 9, 2019

(54) MOBILE DEVICE APPLICATIONS, OTHER APPLICATIONS AND ASSOCIATED KIOSK-BASED SYSTEMS AND METHODS FOR FACILITATING COIN SAVING

(71) Applicant: Outerwall Inc., Bellevue, WA (US)

(72) Inventors: Alexander Stock, New York, NY (US); Adam Rubin, Brooklyn, NY (US); Eric Chung, New York, NY (US); Theron Sarda, New York, NY (US); Jonathan Greenblatt, Brooklyn, NY (US); Kevin King, Sammamish, WA (US); Cord Frieden, Bellevue, WA (US); Tricia Montgomery, Bellevue, WA (US)

(73) Assignee: Coinstar Asset Holdings, LLC, Bellevue, WA (US)

( * ) Notice: Subject to any disclaimer, the term of this patent is extended or adjusted under 35 U.S.C. 154(b) by 689 days.

(21) Appl. No.: 14/946,678

(22) Filed: Nov. 19, 2015

(65) Prior Publication Data

US 2017/0148001 A1 May 25, 2017

(51) Int. Cl.
*G06Q 20/18* (2012.01)
*G06Q 20/20* (2012.01)
(Continued)

(52) U.S. Cl.
CPC ......... *G06Q 20/18* (2013.01); *G06Q 20/0457* (2013.01); *G06Q 20/12* (2013.01);
(Continued)

(58) Field of Classification Search
CPC .................................................... G06Q 20/18
See application file for complete search history.

(56) References Cited

U.S. PATENT DOCUMENTS 269,461 A 12/1882 Eakesteaw
446,303 A 2/1891 Thompson
(Continued)

FOREIGN PATENT DOCUMENTS

CA 1053598 A1 5/1979
CA 2060630 A1 8/1992
(Continued)

OTHER PUBLICATIONS

U.S. Appl. No. 14/617,672, filed Feb. 9, 2015, Lindemulder, Elizabeth L., et al.
(Continued)

*Primary Examiner* — A. Hunter Wilder
(74) *Attorney, Agent, or Firm* — Perkins Coie LLP

(57) ABSTRACT

Various embodiments of methods and systems for saving coins and applying the coin value toward the purchase of selected products are disclosed herein. In some embodiments, the methods and systems described herein can be utilized by parents, grandparents, etc. to encourage and facilitate saving by children. For example, in some embodiments a mobile application is provided that enables a child to select a product to purchase as a "reward" for achieving a savings goal. The mobile application can also enable the child (and/or the child's parent) to set the savings goal, and track the child's progress in reaching the goal as saved coins are periodically exchanged at one or more coin counting kiosks. Other embodiments of the disclosed technology enable the parent and/or child to receive a notification when the child reaches the savings goal, and apply the saved funds toward the purchase of the selected reward.

11 Claims, 12 Drawing Sheets

(51) Int. Cl.
*G06Q 20/12* (2012.01)
*G07D 9/00* (2006.01)
*G09B 19/18* (2006.01)
*G07F 17/42* (2006.01)
*G06Q 20/04* (2012.01)
*G06Q 20/34* (2012.01)
*G06Q 20/38* (2012.01)

(52) U.S. Cl.
CPC ..... *G06Q 20/202* (2013.01); *G06Q 20/35785* (2013.01); *G06Q 20/38215* (2013.01); *G07D 9/00* (2013.01); *G07F 17/42* (2013.01); *G09B 19/18* (2013.01)

(56) References Cited

U.S. PATENT DOCUMENTS

| | | |
|---|---|---|
| 545,185 A | 8/1895 | Yost |
| 576,141 A | 2/1897 | Muenchinger |
| 1,010,993 A | 12/1911 | White |
| 1,234,707 A | 7/1917 | Whistler |
| 1,345,858 A | 7/1920 | Jenkins |
| 1,711,049 A | 4/1929 | Fonda et al. |
| 1,813,296 A | 7/1931 | Kidwell |
| 1,847,940 A | 3/1932 | Giles |
| 1,945,948 A | 2/1934 | Morin |
| 2,014,505 A | 9/1935 | Patche |
| 2,317,351 A | 4/1943 | Hovey |
| 2,461,314 A | 2/1949 | Davis et al. |
| 2,569,360 A | 9/1951 | Weingart |
| 2,644,470 A | 7/1953 | Labbe |
| 2,865,561 A | 12/1958 | Rosapepe |
| 2,881,774 A | 4/1959 | Labbe |
| 2,960,377 A | 11/1960 | Simjian |
| 3,009,555 A | 11/1961 | Seckula |
| 3,048,251 A | 8/1962 | Bower |
| 3,056,132 A | 9/1962 | Simjian |
| 3,065,467 A | 11/1962 | Prevost |
| 3,132,654 A | 5/1964 | Adams |
| 3,173,742 A | 3/1965 | Simjian |
| 3,196,257 A | 7/1965 | Buchholtz et al. |
| 3,227,363 A | 1/1966 | Hecker et al. |
| 3,286,805 A | 11/1966 | New |
| 3,396,737 A | 8/1968 | Picollo |
| 3,415,348 A | 12/1968 | Wahlberg |
| 3,599,771 A | 8/1971 | Hinterstocker |
| 3,603,327 A | 9/1971 | Buchholz et al. |
| 3,709,145 A | 1/1973 | Williamson |
| 3,763,871 A | 10/1973 | Jobst et al. |
| 3,788,440 A | 1/1974 | Propice et al. |
| 3,791,574 A | 2/1974 | Picquot |
| 3,815,717 A | 6/1974 | Arseneau |
| 3,941,226 A | 3/1976 | Drakes |
| 3,960,293 A | 6/1976 | Sweet et al. |
| 3,969,584 A | 7/1976 | Miller et al. |
| 3,982,620 A | 9/1976 | Kortenhaus |
| 3,984,660 A | 10/1976 | Oka et al. |
| 3,998,237 A | 12/1976 | Kressin et al. |
| 4,014,424 A | 3/1977 | Hall |
| 4,036,242 A | 7/1977 | Breitenstein et al. |
| 4,058,954 A | 11/1977 | Asami |
| 4,059,122 A | 11/1977 | Kinoshita |
| 4,092,990 A | 6/1978 | Bayne |
| 4,099,722 A | 7/1978 | Rodesch et al. |
| 4,100,925 A | 7/1978 | Fukunaga |
| 4,106,610 A | 8/1978 | Heiman |
| 4,124,109 A | 11/1978 | Bissell et al. |
| 4,141,372 A | 2/1979 | Gdanski |
| 4,167,949 A | 9/1979 | Hashimoto et al. |
| 4,172,462 A | 10/1979 | Uchida et al. |
| 4,225,056 A | 9/1980 | Flubacker |
| 4,228,811 A | 10/1980 | Tanaka et al. |
| 4,230,213 A | 10/1980 | Spring |
| 4,249,552 A | 2/1981 | Margolin et al. |
| 4,264,282 A | 4/1981 | Crago |
| 4,266,121 A | 5/1981 | Hirose et al. |
| 4,275,751 A | 6/1981 | Bergman |
| 4,306,644 A | 12/1981 | Rockola et al. |
| 4,321,672 A | 3/1982 | Braun et al. |
| 4,326,620 A | 4/1982 | Felix et al. |
| 4,346,798 A | 8/1982 | Agey |
| 4,356,829 A | 11/1982 | Furuya |
| 4,360,034 A | 11/1982 | Davila et al. |
| 4,369,442 A | 1/1983 | Werth et al. |
| 4,369,800 A | 1/1983 | Watanabe et al. |
| 4,374,557 A | 2/1983 | Sugimoto et al. |
| 4,376,442 A | 3/1983 | Gomez et al. |
| 4,380,316 A | 4/1983 | Glinka et al. |
| 4,383,540 A | 5/1983 | De Meyer et al. |
| 4,398,550 A | 8/1983 | Shireman |
| 4,412,292 A | 10/1983 | Sedam et al. |
| 4,412,607 A | 11/1983 | Collins |
| 4,434,359 A | 2/1984 | Watanabe et al. |
| 4,436,103 A | 3/1984 | Dick |
| 4,442,850 A | 4/1984 | Austin et al. |
| 4,447,714 A | 5/1984 | Lundblad et al. |
| 4,503,963 A | 3/1985 | Steiner |
| 4,504,357 A | 3/1985 | Holbein et al. |
| 4,506,685 A | 3/1985 | Childers et al. |
| 4,509,122 A | 4/1985 | Agnew et al. |
| 4,509,633 A | 4/1985 | Chow |
| 4,542,817 A | 9/1985 | Paulson |
| 4,543,969 A | 10/1985 | Rasmussen |
| 4,554,446 A | 11/1985 | Murphy |
| 4,555,618 A | 11/1985 | Riskin |
| 4,558,711 A | 12/1985 | Yoshiaki et al. |
| 4,577,744 A | 3/1986 | Doucet et al. |
| 4,587,984 A | 5/1986 | Levasseur et al. |
| 4,597,487 A | 7/1986 | Crosby et al. |
| 4,598,378 A | 7/1986 | Giacomo |
| 4,611,205 A | 9/1986 | Eglise et al. |
| 4,616,323 A | 10/1986 | Hayashi |
| 4,616,776 A | 10/1986 | Blumenthal et al. |
| 4,620,559 A | 11/1986 | Childers et al. |
| 4,622,456 A | 11/1986 | Naruto et al. |
| 4,641,239 A | 2/1987 | Takesako |
| 4,672,377 A | 6/1987 | Murphy et al. |
| 4,674,055 A | 6/1987 | Ogaki et al. |
| 4,677,565 A | 6/1987 | Ogaki et al. |
| 4,694,845 A | 9/1987 | Zay |
| 4,706,577 A | 11/1987 | Jones et al. |
| 4,706,795 A | 11/1987 | Mikami et al. |
| 4,716,799 A | 1/1988 | Hartmann |
| 4,723,212 A | 2/1988 | Mindrum et al. |
| 4,733,765 A | 3/1988 | Watanabe |
| 4,753,625 A | 6/1988 | Okada |
| 4,767,917 A | 8/1988 | Ushikubo |
| 4,775,353 A | 10/1988 | Childers et al. |
| 4,775,354 A | 10/1988 | Rasmussen et al. |
| 4,809,837 A | 3/1989 | Hayashi et al. |
| 4,814,589 A | 3/1989 | Storch et al. |
| 4,817,043 A | 3/1989 | Brown |
| 4,831,374 A | 5/1989 | Masel |
| 4,833,308 A | 5/1989 | Humble |
| 4,882,675 A | 11/1989 | Nichtberger et al. |
| 4,883,158 A | 11/1989 | Kobayashi et al. |
| 4,884,672 A | 12/1989 | Parker |
| 4,896,791 A | 1/1990 | Smith |
| 4,898,564 A | 2/1990 | Gunn et al. |
| 4,910,672 A | 3/1990 | Off et al. |
| 4,915,205 A | 4/1990 | Reid et al. |
| 4,921,463 A | 5/1990 | Primdahl et al. |
| 4,936,436 A | 6/1990 | Keltner |
| 4,953,086 A | 8/1990 | Fukatsu et al. |
| 4,959,624 A | 9/1990 | Higgins et al. |
| 4,963,118 A | 10/1990 | Gunn et al. |
| 4,964,495 A | 10/1990 | Rasmussen |
| 4,969,549 A | 11/1990 | Eglise et al. |
| 4,977,502 A | 12/1990 | Baker et al. |
| 4,978,322 A | 12/1990 | Paulsen |
| 4,995,848 A | 2/1991 | Goh |
| 4,997,406 A | 3/1991 | Horiguchi et al. |
| 5,010,238 A | 4/1991 | Kadono et al. |
| 5,021,967 A | 6/1991 | Smith |

(56) References Cited

U.S. PATENT DOCUMENTS

| | | |
|---|---|---|
| 5,022,889 A | 6/1991 | Ristvedt et al. |
| 5,025,139 A | 6/1991 | Halliburton |
| 5,027,937 A | 7/1991 | Parish et al. |
| 5,039,848 A | 8/1991 | Stoken |
| 5,040,657 A | 8/1991 | Gunn et al. |
| 5,055,657 A | 10/1991 | Miller et al. |
| 5,056,644 A | 10/1991 | Parker |
| 5,073,767 A | 12/1991 | Holmes et al. |
| 5,083,765 A | 1/1992 | Kringel |
| 5,083,814 A | 1/1992 | Guinta et al. |
| 5,088,587 A | 2/1992 | Goodrich et al. |
| 5,091,713 A | 2/1992 | Horne et al. |
| 5,098,339 A | 3/1992 | Dabrowski |
| 5,098,340 A | 3/1992 | Abe |
| 5,100,367 A | 3/1992 | Abe et al. |
| 5,111,927 A | 5/1992 | Schulze |
| 5,114,381 A | 5/1992 | Ueda et al. |
| 5,135,433 A | 8/1992 | Watanabe et al. |
| 5,163,868 A | 11/1992 | Adams |
| 5,173,851 A | 12/1992 | Off et al. |
| 5,174,608 A | 12/1992 | Benardelli et al. |
| 5,183,142 A | 2/1993 | Latchinian et al. |
| 5,195,626 A | 3/1993 | Le Hong et al. |
| 5,197,588 A | 3/1993 | Furuya et al. |
| 5,201,396 A | 4/1993 | Chalabian et al. |
| 5,219,059 A | 6/1993 | Furuya et al. |
| 5,226,519 A | 7/1993 | DeWoolfson |
| 5,227,874 A | 7/1993 | Kohorn |
| 5,227,966 A | 7/1993 | Ichiba |
| 5,236,339 A | 8/1993 | Nishiumi et al. |
| 5,251,738 A | 10/1993 | Dabrowski |
| 5,252,811 A | 10/1993 | Henochowicz et al. |
| 5,265,033 A | 11/1993 | Vajk et al. |
| 5,293,981 A | 3/1994 | Abe et al. |
| 5,299,672 A | 4/1994 | Nishiumi et al. |
| 5,299,673 A | 4/1994 | Wu |
| 5,302,811 A | 4/1994 | Fukatsu et al. |
| 5,305,195 A | 4/1994 | Singer |
| 5,316,120 A | 5/1994 | Ibarrola |
| 5,316,517 A | 5/1994 | Chiba et al. |
| 5,317,135 A | 5/1994 | Finocchio |
| 5,321,242 A | 6/1994 | Heath |
| 5,328,014 A | 7/1994 | Nishiumi et al. |
| 5,330,041 A | 7/1994 | Dobbins et al. |
| 5,350,906 A | 9/1994 | Brody et al. |
| 5,355,988 A | 10/1994 | Shirasawa |
| 5,365,046 A | 11/1994 | Haymann |
| 5,374,814 A | 12/1994 | Kako et al. |
| 5,388,680 A | 2/1995 | Hird et al. |
| RE34,915 E | 4/1995 | Nichtberger et al. |
| 5,409,092 A | 4/1995 | Itako et al. |
| 5,429,222 A | 7/1995 | Delay et al. |
| 5,435,777 A | 7/1995 | Takatani et al. |
| 5,440,108 A | 8/1995 | Tran et al. |
| 5,441,139 A | 8/1995 | Abe et al. |
| 5,449,058 A | 9/1995 | Kotler et al. |
| 5,457,305 A | 10/1995 | Akel |
| 5,469,951 A | 11/1995 | Takemoto et al. |
| 5,479,507 A | 12/1995 | Anderson |
| 5,483,363 A | 1/1996 | Holmes et al. |
| 5,506,393 A | 4/1996 | Ziarno |
| 5,511,114 A | 4/1996 | Stimson et al. |
| 5,513,738 A | 5/1996 | Hird et al. |
| 5,531,640 A | 7/1996 | Inoue |
| 5,554,070 A | 9/1996 | Takatoshi et al. |
| 5,555,497 A | 9/1996 | Helbling |
| 5,560,467 A | 10/1996 | Takemoto et al. |
| 5,564,546 A | 10/1996 | Molbak et al. |
| 5,564,974 A | 10/1996 | Mazur et al. |
| 5,577,109 A | 11/1996 | Beshear et al. |
| 5,577,959 A | 11/1996 | Takemoto et al. |
| 5,620,079 A | 4/1997 | Molback |
| 5,637,845 A | 6/1997 | Kolls |
| 5,650,604 A | 7/1997 | Marcous et al. |
| 5,652,421 A | 7/1997 | Veeneman et al. |
| 5,661,285 A | 8/1997 | Elrick et al. |
| 5,663,546 A | 9/1997 | Cucinotta et al. |
| 5,665,952 A | 9/1997 | Ziarno |
| D385,488 S | 10/1997 | Smith et al. |
| 5,679,070 A | 10/1997 | Ishida et al. |
| 5,696,908 A | 12/1997 | Muehlberger et al. |
| 5,699,328 A | 12/1997 | Ishizaki et al. |
| 5,721,768 A | 2/1998 | Stimson et al. |
| 5,732,398 A | 3/1998 | Tagawa |
| 5,734,722 A | 3/1998 | Halpern |
| 5,743,429 A | 4/1998 | Morofsky |
| 5,746,299 A | 5/1998 | Molbak |
| 5,746,322 A | 5/1998 | LaVeine et al. |
| 5,748,908 A | 5/1998 | Yu |
| 5,777,305 A | 7/1998 | Smith et al. |
| 5,799,767 A | 9/1998 | Molback |
| 5,835,061 A | 11/1998 | Stewart |
| 5,839,956 A | 11/1998 | Takemoto et al. |
| 5,842,916 A | 12/1998 | Gerrity et al. |
| 5,868,236 A | 2/1999 | Rademacher |
| 5,880,444 A | 3/1999 | Shibata et al. |
| 5,903,880 A | 5/1999 | Biffar |
| 5,905,810 A | 5/1999 | Jones et al. |
| 5,909,792 A | 6/1999 | Gerlier et al. |
| 5,909,793 A | 6/1999 | Beach et al. |
| 5,909,794 A | 6/1999 | Molback et al. |
| 5,943,423 A | 8/1999 | Muftic |
| 5,943,655 A | 8/1999 | Jacobson |
| 5,953,504 A | 9/1999 | Sokal et al. |
| 5,956,697 A | 9/1999 | Usui |
| 5,964,830 A | 10/1999 | Durrett |
| 5,974,146 A | 10/1999 | Randle et al. |
| 5,982,918 A | 11/1999 | Mennie et al. |
| 5,988,348 A | 11/1999 | Martin |
| 5,991,413 A | 11/1999 | Arditti et al. |
| 6,014,636 A | 1/2000 | Reeder |
| 6,014,646 A | 1/2000 | Vallee et al. |
| 6,017,063 A | 1/2000 | Nilssen |
| 6,021,883 A | 2/2000 | Casanova et al. |
| 6,028,920 A | 2/2000 | Carson |
| 6,047,807 A | 4/2000 | Molbak |
| 6,047,808 A | 4/2000 | Neubarth et al. |
| 6,053,807 A | 4/2000 | Metzger et al. |
| 6,068,550 A | 5/2000 | Breitholtz et al. |
| 6,081,791 A | 6/2000 | Clark |
| 6,105,007 A | 8/2000 | Norris |
| 6,105,008 A | 8/2000 | Davis et al. |
| 6,105,009 A | 8/2000 | Cuervo |
| 6,110,044 A | 8/2000 | Stern |
| 6,116,402 A | 9/2000 | Beach et al. |
| 6,119,099 A | 9/2000 | Walker et al. |
| 6,119,945 A | 9/2000 | Muller et al. |
| 6,128,402 A | 10/2000 | Cummins-Allison |
| 6,129,275 A | 10/2000 | Urquhart et al. |
| 6,138,106 A | 10/2000 | Walker et al. |
| 6,144,946 A | 11/2000 | Iwamura et al. |
| 6,152,365 A | 11/2000 | Kolls |
| 6,185,545 B1 | 2/2001 | Resnick et al. |
| 6,193,155 B1 | 2/2001 | Walker et al. |
| 6,196,371 B1 | 3/2001 | Martin et al. |
| 6,227,343 B1 | 5/2001 | Neathway et al. |
| 6,230,928 B1 | 5/2001 | Hanna et al. |
| 6,233,564 B1 | 5/2001 | Schulze |
| 6,243,450 B1 | 6/2001 | Jansen et al. |
| 6,243,687 B1 | 6/2001 | Powell |
| 6,264,545 B1 | 7/2001 | Magee et al. |
| 6,267,292 B1 | 7/2001 | Walker et al. |
| 6,269,349 B1 | 7/2001 | Aieta et al. |
| 6,289,324 B1 | 9/2001 | Kawan |
| 6,292,211 B1 | 9/2001 | Pena |
| 6,308,887 B1 | 10/2001 | Korman et al. |
| 6,318,536 B1 | 11/2001 | Korman et al. |
| 6,318,537 B1 | 11/2001 | Jones et al. |
| 6,330,544 B1 | 12/2001 | Jindal et al. |
| 6,349,972 B1 | 2/2002 | Geiger et al. |
| 6,363,164 B1 | 3/2002 | Jones et al. |
| 6,370,240 B1 | 4/2002 | Woynoski et al. |
| 6,370,514 B1 | 4/2002 | Messner et al. |
| 6,375,080 B1 | 4/2002 | Cremonese |

(56) References Cited

U.S. PATENT DOCUMENTS

| | | |
|---|---|---|
| 6,390,269 B1 | 5/2002 | Billington et al. |
| 6,401,010 B1 | 6/2002 | Takahashi |
| 6,405,182 B1 | 6/2002 | Cuervo |
| 6,415,262 B1 | 7/2002 | Walker et al. |
| 6,456,981 B1 | 9/2002 | Dejaeger et al. |
| 6,460,357 B1 | 10/2002 | Doi et al. |
| 6,484,863 B1 | 11/2002 | Molbak |
| 6,494,776 B1 | 12/2002 | Molbak |
| 6,499,052 B1 | 12/2002 | Lu et al. |
| 6,502,745 B1 | 1/2003 | Stimson et al. |
| 6,505,774 B1 | 1/2003 | Fulcher et al. |
| 6,536,037 B1 | 3/2003 | Guheen et al. |
| 6,554,184 B1 | 4/2003 | Amos |
| 6,575,361 B1 | 6/2003 | Graves et al. |
| 6,575,362 B1 | 6/2003 | Bator et al. |
| 6,594,644 B1 | 7/2003 | Van et al. |
| 6,607,136 B1 | 8/2003 | Altman et al. |
| 6,628,934 B2 | 9/2003 | Rosenberg et al. |
| 6,637,576 B1 | 10/2003 | Jones et al. |
| 6,659,259 B2 | 12/2003 | Knox et al. |
| 6,661,910 B2 | 12/2003 | Jones et al. |
| 6,694,300 B1 | 2/2004 | Walker et al. |
| 6,704,039 B2 | 3/2004 | Pena |
| 6,705,448 B1 | 3/2004 | Steel et al. |
| 6,736,251 B2 | 5/2004 | Molbak |
| 6,745,022 B2 | 6/2004 | Knox |
| 6,748,067 B2 | 6/2004 | Malik |
| 6,748,101 B1 | 6/2004 | Jones et al. |
| 6,758,316 B2 | 7/2004 | Molbak |
| 6,772,146 B2 | 8/2004 | Khemlani et al. |
| 6,778,693 B2 | 8/2004 | Jones et al. |
| 6,799,084 B2 | 9/2004 | Grobler |
| 6,823,172 B1 | 11/2004 | Forrest |
| 6,829,596 B1 | 12/2004 | Frazee |
| 6,854,581 B2 | 2/2005 | Molbak |
| 6,857,562 B2 | 2/2005 | Sasaki |
| 6,918,537 B2 | 7/2005 | Graves et al. |
| 6,934,529 B2 | 8/2005 | Bagoren et al. |
| 6,945,457 B1 | 9/2005 | Barcelou |
| 6,960,986 B2 | 11/2005 | Asama et al. |
| 6,973,172 B1 | 12/2005 | Bitove et al. |
| 6,973,443 B2 | 12/2005 | Drummond et al. |
| 6,976,570 B2 | 12/2005 | Molbak |
| 6,999,569 B2 | 2/2006 | Risafi et al. |
| 7,006,993 B1 | 2/2006 | Cheong et al. |
| 7,028,827 B1 | 4/2006 | Molbak et al. |
| 7,028,891 B2 | 4/2006 | O'Neal |
| 7,039,603 B2 | 5/2006 | Walker et al. |
| 7,054,842 B2 | 5/2006 | James et al. |
| 7,058,581 B1 | 6/2006 | Young |
| 7,083,084 B2 | 8/2006 | Graves et al. |
| 7,093,761 B2 | 8/2006 | Smith et al. |
| 7,113,929 B1 | 9/2006 | Beach et al. |
| 7,131,580 B2 | 11/2006 | Molbak |
| 7,156,300 B1 | 1/2007 | Dentlinger |
| 7,168,615 B2 | 1/2007 | Smith |
| 7,184,980 B2 | 2/2007 | Allen-Rouman et al. |
| 7,209,889 B1 | 4/2007 | Whitfield |
| 7,249,054 B2 | 7/2007 | Keil |
| 7,251,626 B2 | 7/2007 | Blackson et al. |
| 7,252,226 B2 | 8/2007 | Risafi et al. |
| 7,255,268 B2 | 8/2007 | Dentlinger |
| 7,266,533 B2 | 9/2007 | Yoder et al. |
| 7,287,005 B1 | 10/2007 | Bruecken et al. |
| 7,303,119 B2 | 12/2007 | Molbak |
| 7,311,249 B2 | 12/2007 | Smith et al. |
| 7,313,546 B2 | 12/2007 | Alarcon-Luther et al. |
| 7,328,190 B2 | 2/2008 | Smith et al. |
| 7,333,955 B2 | 2/2008 | Graves et al. |
| RE40,186 E | 3/2008 | Walker et al. |
| 7,343,349 B2 | 3/2008 | Ranzini et al. |
| 7,349,566 B2 | 3/2008 | Jones et al. |
| 7,356,507 B2 | 4/2008 | Bezos et al. |
| 7,398,225 B2 | 7/2008 | Voltmer et al. |
| 7,426,493 B2 | 9/2008 | Takeshima et al. |
| 7,473,177 B2 | 1/2009 | Friesen et al. |
| 7,505,941 B2 | 3/2009 | Bishop et al. |
| 7,522,716 B2 | 4/2009 | Paschini |
| 7,527,193 B2 | 5/2009 | Molbak |
| 7,529,563 B1 | 5/2009 | Pitroda |
| 7,630,926 B2 | 12/2009 | Chakiris et al. |
| 7,634,425 B2 | 12/2009 | Satomi et al. |
| 7,647,259 B2 | 1/2010 | De Fabrega |
| 7,653,599 B2 | 1/2010 | Doran et al. |
| 7,660,767 B1 | 2/2010 | Schultz et al. |
| 7,676,431 B2 | 3/2010 | Burney et al. |
| 7,778,456 B2 | 8/2010 | Jones et al. |
| 7,780,075 B2 | 8/2010 | Cooper et al. |
| 7,865,432 B2 | 1/2011 | Doran et al. |
| 7,865,447 B2 | 1/2011 | Rosenhaft et al. |
| 7,874,478 B2 | 1/2011 | Molbak |
| 7,904,565 B2 | 3/2011 | Holden et al. |
| 7,971,699 B2 | 7/2011 | Molbak |
| 8,005,425 B2 | 8/2011 | Defosse et al. |
| 8,024,272 B2 | 9/2011 | Doran et al. |
| 8,033,375 B2 | 10/2011 | Doran et al. |
| 8,082,195 B2 | 12/2011 | Enzaldo |
| 8,083,133 B2 | 12/2011 | Seifert et al. |
| 8,103,586 B2 | 1/2012 | Doran et al. |
| 8,152,060 B2 | 4/2012 | Wolfe et al. |
| 8,152,061 B2 | 4/2012 | Wolfe et al. |
| 8,175,965 B2 | 5/2012 | Moore et al. |
| 8,229,851 B2 | 7/2012 | Doran et al. |
| 8,332,313 B2 | 12/2012 | Doran et al. |
| 8,438,073 B2 | 5/2013 | White |
| 8,447,650 B2 | 5/2013 | Postrel |
| 8,485,890 B2 | 7/2013 | Gagner et al. |
| 8,489,452 B1 | 7/2013 | Mellas et al. |
| 8,494,956 B2 | 7/2013 | Tulluri et al. |
| 8,500,007 B2 | 8/2013 | Wolfe et al. |
| 8,503,641 B2 | 8/2013 | Bushey |
| 8,515,808 B2 | 8/2013 | Postrel |
| 8,528,814 B2 | 9/2013 | Wolfe |
| 8,528,828 B2 | 9/2013 | Fleischer et al. |
| 8,533,036 B2 | 9/2013 | Shukla et al. |
| 8,533,037 B2 | 9/2013 | Postrel |
| 8,556,707 B2 | 10/2013 | Potts et al. |
| 8,566,169 B2 | 10/2013 | Bohanan et al. |
| 8,571,983 B1 | 10/2013 | Blackhurst et al. |
| 8,589,267 B2 | 11/2013 | Hurst |
| 8,589,297 B2 | 11/2013 | Enzaldo |
| 8,595,074 B2 | 11/2013 | Sharma et al. |
| 8,600,807 B1 | 12/2013 | Postrel |
| 8,602,297 B2 | 12/2013 | Wilen |
| 8,612,290 B2 | 12/2013 | Postrel |
| 8,631,999 B2 | 1/2014 | Wolfe et al. |
| 8,660,944 B2 | 2/2014 | Liu et al. |
| 8,668,146 B1 | 3/2014 | McGhie et al. |
| 8,675,840 B2 | 3/2014 | Risafi et al. |
| 8,676,672 B2 | 3/2014 | Nelsen |
| 8,701,982 B2 | 4/2014 | Yankovich et al. |
| 8,701,991 B2 | 4/2014 | Wolfe |
| 8,712,854 B1 | 4/2014 | Rafferty et al. |
| 8,725,564 B2 | 5/2014 | Postrel |
| 8,733,637 B1 | 5/2014 | Cedeno |
| 8,751,294 B2 | 6/2014 | Bhattacharya et al. |
| 8,762,278 B2 | 6/2014 | Miller et al. |
| 8,820,634 B2 | 9/2014 | Kelly et al. |
| 8,874,467 B2 | 10/2014 | Yahn et al. |
| 8,887,999 B2 | 11/2014 | Kelly et al. |
| 8,967,324 B2 | 3/2015 | White et al. |
| 9,002,737 B2 | 4/2015 | Wilen |
| 9,064,268 B2 | 6/2015 | Larrick et al. |
| 2001/0001856 A1 | 5/2001 | Gould et al. |
| 2001/0007098 A1 | 7/2001 | Hinrichs et al. |
| 2001/0007983 A1 | 7/2001 | Lee |
| 2001/0011680 A1 | 8/2001 | Soltesz et al. |
| 2001/0023409 A1 | 9/2001 | Keil |
| 2001/0029484 A1 | 10/2001 | Schultz et al. |
| 2001/0051902 A1 | 12/2001 | Messner |
| 2002/0026423 A1 | 2/2002 | Maritzen et al. |
| 2002/0032605 A1 | 3/2002 | Lee |
| 2002/0032641 A1 | 3/2002 | Mendiola et al. |
| 2002/0046341 A1 | 4/2002 | Kazaks et al. |

(56) References Cited

U.S. PATENT DOCUMENTS

| | | |
|---|---|---|
| 2002/0065724 A1 | 5/2002 | Tsuruda |
| 2002/0072974 A1 | 6/2002 | Pugliese, III et al. |
| 2002/0082962 A1 | 6/2002 | Farris et al. |
| 2002/0085037 A1 | 7/2002 | Leavitt et al. |
| 2002/0087462 A1 | 7/2002 | Seifert et al. |
| 2002/0091603 A1 | 7/2002 | Steiger, Jr. et al. |
| 2002/0100660 A1 | 8/2002 | Stieber et al. |
| 2002/0107738 A1 | 8/2002 | Beach et al. |
| 2002/0112162 A1 | 8/2002 | Cocotis et al. |
| 2002/0147683 A1 | 10/2002 | Capobianco et al. |
| 2002/0156676 A1 | 10/2002 | Ahrens et al. |
| 2002/0162895 A1 | 11/2002 | Neto |
| 2002/0174235 A1 | 11/2002 | Likourezos |
| 2002/0188511 A1 | 12/2002 | Johnson et al. |
| 2002/0194122 A1 | 12/2002 | Knox et al. |
| 2003/0024979 A1 | 2/2003 | Hansen et al. |
| 2003/0046231 A1 | 3/2003 | Wu |
| 2003/0046249 A1 | 3/2003 | Wu |
| 2003/0081824 A1 | 5/2003 | Mennie et al. |
| 2003/0130940 A1 | 7/2003 | Hansen et al. |
| 2003/0149662 A1 | 8/2003 | Shore |
| 2003/0168508 A1 | 9/2003 | Daellenbach et al. |
| 2003/0173405 A1 | 9/2003 | Wilz, Sr. et al. |
| 2003/0233318 A1 | 12/2003 | King et al. |
| 2004/0024700 A1 | 2/2004 | Petigny |
| 2004/0088252 A1 | 5/2004 | Jenny et al. |
| 2004/0098740 A1 | 5/2004 | Maritzen et al. |
| 2005/0038737 A1 | 2/2005 | Norris |
| 2005/0108104 A1 | 5/2005 | Woo et al. |
| 2005/0108155 A1 | 5/2005 | Gallagher et al. |
| 2005/0144074 A1 | 6/2005 | Fredregill et al. |
| 2005/0171902 A1 | 8/2005 | Nguyen |
| 2005/0203835 A1 | 9/2005 | Nhaissi et al. |
| 2005/0203836 A1 | 9/2005 | Woodward et al. |
| 2005/0227769 A1 | 10/2005 | Morrow et al. |
| 2006/0089908 A1 | 4/2006 | Keohane et al. |
| 2006/0131387 A1 | 6/2006 | Hansen et al. |
| 2006/0207856 A1 | 9/2006 | Dean et al. |
| 2006/0249568 A1 | 11/2006 | Scanlon et al. |
| 2006/0287970 A1 | 12/2006 | Chess et al. |
| 2006/0293965 A1 | 12/2006 | Burton |
| 2007/0089064 A1 | 4/2007 | Facemire et al. |
| 2007/0125620 A1 | 6/2007 | Sorenson et al. |
| 2007/0234223 A1 | 10/2007 | Leavitt et al. |
| 2008/0052182 A1 | 2/2008 | Marshall et al. |
| 2008/0072145 A1 | 3/2008 | Blanchard et al. |
| 2008/0082972 A1 | 4/2008 | De Sutter et al. |
| 2008/0162299 A1 | 7/2008 | Gusler et al. |
| 2008/0163079 A1 | 7/2008 | Haug et al. |
| 2008/0172623 A1 | 7/2008 | Roche et al. |
| 2008/0288400 A1 | 11/2008 | Panthaki et al. |
| 2009/0069051 A1 | 3/2009 | Jain et al. |
| 2009/0240624 A1 | 9/2009 | James et al. |
| 2009/0242626 A1 | 10/2009 | Jones et al. |
| 2009/0265269 A1 | 10/2009 | Stoecker |
| 2009/0302103 A1 | 12/2009 | Kolinski-Schultz et al. |
| 2009/0307622 A1 | 12/2009 | Jalon et al. |
| 2009/0313358 A1 | 12/2009 | Shepherd et al. |
| 2010/0057612 A1 | 3/2010 | Wagenhals et al. |
| 2010/0063906 A1 | 3/2010 | Nelsen et al. |
| 2010/0122329 A1 | 5/2010 | Jakobsson et al. |
| 2010/0131413 A1 | 5/2010 | Kranzley et al. |
| 2010/0200654 A1 | 8/2010 | Wolfe et al. |
| 2011/0184834 A1 | 7/2011 | Perrochon et al. |
| 2011/0208637 A1 | 8/2011 | Wakita et al. |
| 2011/0225063 A1 | 9/2011 | Grunski et al. |
| 2011/0238549 A1 | 9/2011 | Poon |
| 2011/0282784 A1 | 11/2011 | Nelsen |
| 2012/0054049 A1 | 3/2012 | Hayes |
| 2012/0059736 A1 | 3/2012 | Bhattacharya et al. |
| 2012/0109787 A1 | 5/2012 | Larrick et al. |
| 2012/0124496 A1 | 5/2012 | Rose et al. |
| 2012/0137235 A1 | 5/2012 | T S et al. |
| 2012/0143705 A1 | 6/2012 | Bhattacharya et al. |
| 2012/0156976 A1 | 6/2012 | Blake et al. |
| 2012/0173351 A1 | 7/2012 | Hanson et al. |
| 2012/0259698 A1 | 10/2012 | Yurow et al. |
| 2012/0310848 A1 | 12/2012 | Gao et al. |
| 2012/0323787 A1 | 12/2012 | Nelsen |
| 2013/0065686 A1 | 3/2013 | LeMay et al. |
| 2013/0066735 A1 | 3/2013 | Llach |
| 2013/0080235 A1 | 3/2013 | Wolfe |
| 2013/0091055 A1 | 4/2013 | Doran et al. |
| 2013/0144732 A1 | 6/2013 | Rothschild |
| 2013/0159130 A1 | 6/2013 | Gaur et al. |
| 2013/0161153 A1 | 6/2013 | Saez et al. |
| 2013/0191178 A1 | 7/2013 | Thompson et al. |
| 2013/0191202 A1 | 7/2013 | Postrel |
| 2013/0204681 A1 | 8/2013 | Kraft et al. |
| 2013/0204686 A1 | 8/2013 | Roberts et al. |
| 2013/0204688 A1 | 8/2013 | Yahn |
| 2013/0204781 A1 | 8/2013 | Flitcroft et al. |
| 2013/0246209 A1 | 9/2013 | White |
| 2013/0254074 A1 | 9/2013 | Joa et al. |
| 2013/0254086 A1 | 9/2013 | Joa et al. |
| 2013/0254106 A1 | 9/2013 | Webber et al. |
| 2013/0268413 A1 | 10/2013 | Burr et al. |
| 2013/0275246 A1 | 10/2013 | Ramaratnam et al. |
| 2013/0297473 A1 | 11/2013 | Wolfe |
| 2013/0304559 A1 | 11/2013 | Stone et al. |
| 2013/0304620 A1 | 11/2013 | Bhattacharya et al. |
| 2014/0006268 A1 | 1/2014 | Roberts et al. |
| 2014/0012647 A1 | 1/2014 | Hecht |
| 2014/0046784 A1 | 2/2014 | Prakash et al. |
| 2014/0052525 A1 | 2/2014 | Postrel |
| 2014/0058868 A1 | 2/2014 | Sharma et al. |
| 2014/0081736 A1 | 3/2014 | Blackhurst et al. |
| 2014/0095218 A1 | 4/2014 | Golembeski |
| 2014/0100939 A1 | 4/2014 | Postrel |
| 2014/0108196 A1 | 4/2014 | Yankovich et al. |
| 2014/0122324 A1 | 5/2014 | Spier |
| 2014/0122327 A1 | 5/2014 | Aleles et al. |
| 2014/0122331 A1 | 5/2014 | Vaish et al. |
| 2014/0136351 A1 | 5/2014 | Lennon |
| 2014/0143089 A1 | 5/2014 | Campos et al. |
| 2014/0156511 A1 | 6/2014 | Ren |
| 2014/0201012 A1 | 7/2014 | Doran et al. |
| 2014/0236841 A1 | 8/2014 | Tan et al. |
| 2014/0257958 A1 | 9/2014 | Andrews |
| 2014/0289111 A1 | 9/2014 | Doran et al. |
| 2015/0012305 A1 | 1/2015 | Truskovsky et al. |
| 2015/0025987 A1 | 1/2015 | Yahn |
| 2015/0170124 A1 | 6/2015 | Sorenson et al. |
| 2015/0254707 A1 | 9/2015 | Larrick et al. |
| 2015/0278801 A1 | 10/2015 | Friedlander et al. |
| 2017/0039559 A1 | 2/2017 | Frieden |
| 2017/0323282 A1 | 11/2017 | Doran et al. |
| 2018/0000594 A1 | 1/2018 | Yahn et al. |

FOREIGN PATENT DOCUMENTS

| | | |
|---|---|---|
| CA | 2067987 A1 | 11/1992 |
| CA | 2421308 A1 | 3/2002 |
| CH | 680171 A5 | 6/1992 |
| DE | 660354 C | 5/1938 |
| DE | 2528735 A1 | 4/1976 |
| DE | 3021327 A1 | 12/1981 |
| DE | 3147603 A1 | 6/1983 |
| EP | 0313294 A2 | 4/1989 |
| EP | 0351217 A2 | 1/1990 |
| EP | 0420163 A1 | 4/1991 |
| EP | 0458610 A1 | 11/1991 |
| EP | 0477722 A2 | 4/1992 |
| EP | 0857579 A2 | 8/1998 |
| EP | 0924662 A2 | 6/1999 |
| EP | 0924664 A2 | 6/1999 |
| EP | 0924665 A2 | 6/1999 |
| EP | 1178448 A2 | 2/2002 |
| EP | 2367150 A1 | 9/2011 |
| FR | 2042254 A5 | 2/1971 |
| FR | 2342531 A1 | 9/1977 |
| GB | 958741 A | 5/1964 |
| GB | 1564723 A | 4/1980 |
| GB | 2095452 A | 9/1982 |

(56) References Cited

FOREIGN PATENT DOCUMENTS

| | | | |
|---|---|---|---|
| GB | 2121582 | A | 12/1983 |
| GB | 2153128 | A | 8/1985 |
| GB | 2175427 | A | 11/1986 |
| GB | 2186411 | A | 8/1987 |
| GB | 2188467 | A | 9/1987 |
| GB | 2198274 | A | 6/1988 |
| GB | 2223340 | A | 4/1990 |
| GB | 2223872 | A | 4/1990 |
| GB | 2255666 | A | 11/1992 |
| IE | 80670 | B2 | 11/1998 |
| JP | 392994 | | 10/1989 |
| JP | 281193 | | 3/1990 |
| JP | 363795 | A | 3/1991 |
| JP | 392994 | | 4/1991 |
| JP | 1307891 | A | 11/1999 |
| JP | 3252795 | B2 | 2/2002 |
| JP | 2006301807 | A | 11/2006 |
| JP | 2007241925 | A | 9/2007 |
| JP | 2007257578 | A | 10/2007 |
| JP | 4315288 | B2 | 8/2009 |
| JP | 4344995 | B2 | 10/2009 |
| JP | 5249892 | B2 | 7/2013 |
| JP | 5250296 | B2 | 7/2013 |
| SE | 44244 | C1 | 9/1918 |
| SE | 44247 | C1 | 9/1918 |
| SE | 50250 | C1 | 11/1919 |
| SE | 8801851 | A | 11/1989 |
| WO | 9406101 | A1 | 3/1994 |
| WO | 9409440 | A1 | 4/1994 |
| WO | 9530215 | A1 | 11/1995 |
| WO | 9626508 | A1 | 8/1996 |
| WO | 9630877 | A1 | 10/1996 |
| WO | 9825241 | A2 | 6/1998 |
| WO | 9836521 | A1 | 8/1998 |
| WO | 9900772 | A1 | 1/1999 |
| WO | 9928830 | A1 | 6/1999 |
| WO | 9950785 | A1 | 10/1999 |
| WO | 0010138 | A1 | 2/2000 |
| WO | 0011568 | A1 | 3/2000 |
| WO | 0025507 | A1 | 5/2000 |
| WO | 0075889 | A2 | 12/2000 |
| WO | 0139093 | A1 | 5/2001 |
| WO | 01037172 | A1 | 5/2001 |
| WO | 0142945 | A1 | 6/2001 |
| WO | 0159722 | A2 | 8/2001 |
| WO | 0191035 | A1 | 11/2001 |
| WO | 0207071 | A1 | 1/2002 |
| WO | 0209001 | A1 | 1/2002 |
| WO | 02075680 | A1 | 9/2002 |
| WO | 03046845 | A2 | 6/2003 |
| WO | 03071386 | A2 | 8/2003 |
| WO | 03071387 | A2 | 8/2003 |
| WO | 03071495 | A1 | 8/2003 |
| WO | 2008015637 | A2 | 2/2008 |
| WO | 2008027324 | A2 | 3/2008 |

OTHER PUBLICATIONS

"ACI Gift Cards, Inc. Launches Amazon Gift Codes on Demand," Sep. 5, 2008, available at http://www.reuters.com/article/2008/09/05/idus11420+05-sep-2008+bw2008905.

"Cash in your jar of change without paying fees to do it," Nov. 21, 2009, available at http://www.examiner.com/article/cash-your-jar-of-change-without-paying-fees-to-do-it.

1-800 Gift Certificate, http://www.800giftcertificate.com, accessed Feb. 16, 1999, 12 pages.

US 10,346,819 B2

MOBILE DEVICE APPLICATIONS, OTHER APPLICATIONS AND ASSOCIATED KIOSK-BASED SYSTEMS AND METHODS FOR FACILITATING COIN SAVING

TECHNICAL FIELD

The present disclosure relates generally to systems, apparatuses and methods for saving coins and applying the coin value toward the purchase of selected products and, more particularly, to systems, apparatuses and methods for engaging children in the savings process.

BACKGROUND

For many children, their first experience with money often involves coins. They typically start by learning the value of different coins, and then progress to making relatively small purchases with coins. Parents have traditionally encouraged their children to save coins at a young age, as saving provides a way to instill a sense of responsibility in children, and lets them experience the satisfaction of setting and achieving goals.

There are a number of ways that children and other people can exchange their saved coins for cash. For example, they can take their coins to a local bank, but some banks require that the coins be rolled and counted before they can be deposited or exchanged for cash. Consumers can also exchange their coins for cash vouchers, e-certificates, or other products at a consumer-operated coin counting kiosk. Outerwall Inc., for example, operates a network of consumer-operated coin counting kiosks located in retail stores, banks and other publicly accessible areas. The kiosks count loose coins and dispense vouchers that can be redeemed for cash or merchandise. Many of the kiosks also offer other products and services, such as e-certificates, gift cards, account transfers, etc.

Although teaching children to save their money at an early age has many benefits, it can often be difficult to motivate children to save because they may not appreciate the connection between disciplined saving and the ability to purchase things that they desire. Accordingly, it would be advantageous to provide parents with access to tools and resources that could help them encourage their children to set saving goals and engage in saving programs to achieve those goals.

DETAILED DESCRIPTION

Figure 1:
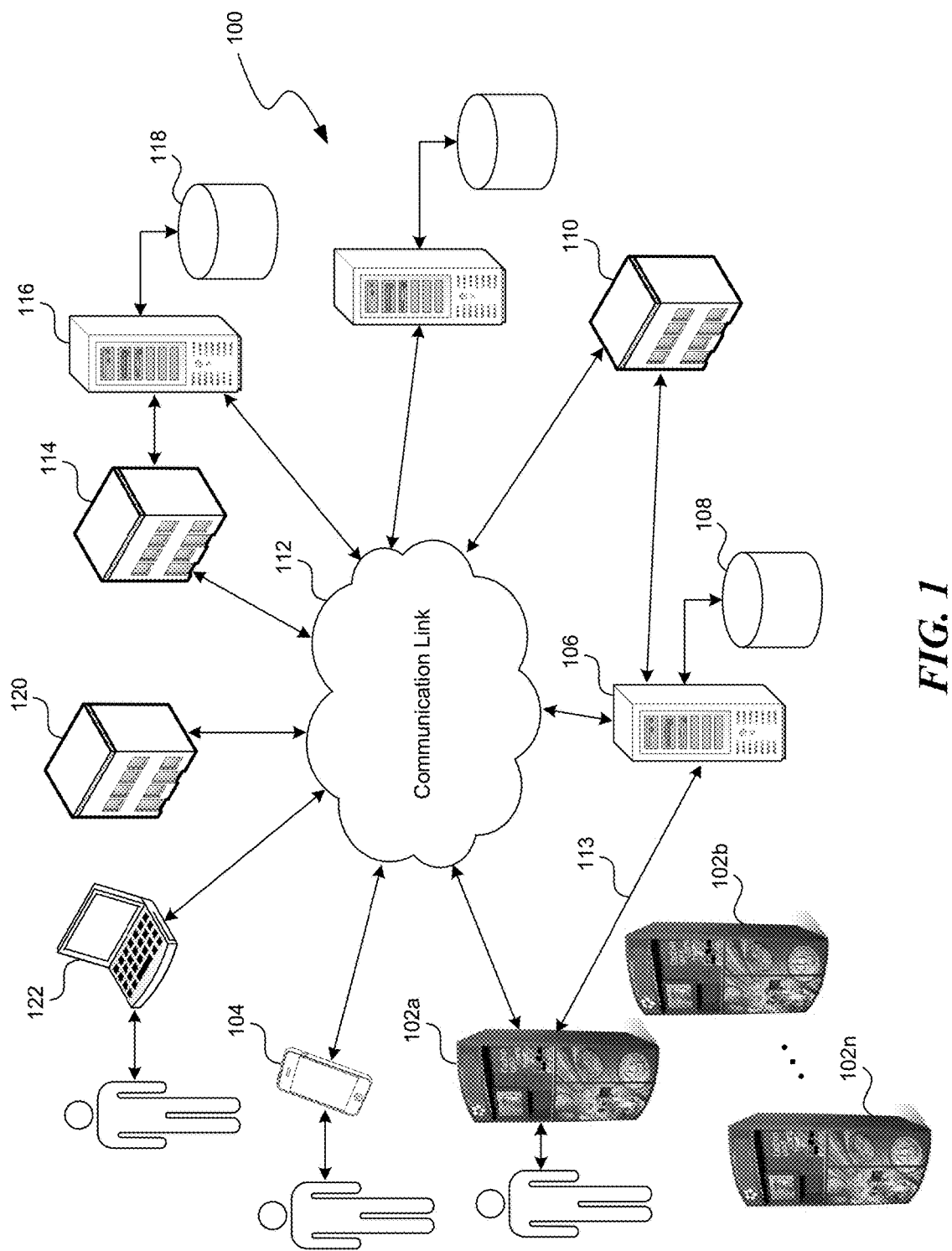
FIG. 1 is a schematic diagram illustrating an environment for facilitating coin saving and selecting products for purchase with saved coin value, in accordance with an embodiment of the present technology.

The following disclosure describes various embodiments of systems and methods for saving coins and applying the saved coin value toward the purchase of selected products. For example, some embodiments of the present disclosure include an application (e.g., a "mobile app") that can be used to motivate children to save coins and engage them in the saving process. The mobile app can provide children with an online marketplace where they can shop for child-appropriate items (e.g., sports equipment, toys, etc.) and select an item as a "reward" for reaching a savings "goal." The mobile app can also enable parents (and/or the child) to set the savings "goal," which represents a portion of the purchase price of the selected item that the child must save before the parent purchases the item for the child as the reward. Additionally, the mobile app can also enable the child and/or the parent to track the child's progress toward reaching the savings goal and receiving the reward. Embodiments of the applications described herein can be referred to as "savings applications," and in addition to being implemented on smartphones and other mobile devices, they can also be implemented on other user devices, such as personal computers, laptops, etc.

In some embodiments, the disclosed technology can also include one or more specialized coin containers for holding the child's coin savings. As the child's coin savings accumulate over time, the parent (or the parent and the child) can take the coins to a consumer-operated coin counting kiosk and exchange the coins for, e.g., a redeemable cash voucher. In some embodiments, the cash voucher can be redeemed for a cash value that is less than the total value of the coins exchanged at the kiosk in the coin counting transaction. For example, the voucher may be redeemable for a cash value that is equal to the total coin value minus a service fee. In some embodiments, the coin counting kiosk (and/or a remote computer associated therewith) can also provide the person exchanging the coins with a unique code that enables the child to track his or her saving progress. For example, the kiosk can print the unique code on the redeemable voucher, and/or the kiosk can display the unique code on a kiosk display screen. In addition or alternatively, the unique code can be electronically sent (via, e.g., email, text message, etc.) to an electronic address of, e.g., the parent. The child can enter the unique code into an associated display page of, e.g., the mobile app executing on a mobile device (e.g., a smartphone), and the mobile app can add the coin value from the recent coin exchange transaction to the child's existing savings and display the resulting savings total. Accordingly, the application enables the child to track his or her savings progress and see how close they are to achieving the savings goal they set. Once the child reaches his or her goal, the parent (and/or the child) can receive an email or other electronic message notifying them that the child has met the goal and providing them with, for example, a link to a website so that the parent can purchase the selected item for the child as a reward.

Certain details are set forth in the following description and in FIGS. 1-13 to provide a thorough understanding of various embodiments of the present technology. In other instances, well-known structures, materials, operations and/or systems often associated with consumer-operated kiosks, application software, mobile apps, mobile devices, processing devices and network systems are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Many of the details, dimensions, angles, arrangements and other features shown in the Figures are merely illustrative of particular embodiments of the technology. Accordingly, other embodiments can have other such features without departing from the spirit or scope of the present invention. In addition, those of ordinary skill in the art will appreciate that further embodiments of the invention can be practiced without several of the details described below.

In the Figures, identical reference numbers generally identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

FIG. 1 is a schematic diagram of a suitable computing environment 100 in which various embodiments of the present technology can be implemented. In the illustrated embodiment, the environment includes a plurality of consumer-operated coin counting kiosks 102 (identified individually as kiosks 102a-102n) that can be operably connected to one or more remote computers, such as a kiosk server computer 106 ("kiosk server 106"), via a communication link 112. The communication link 112 can include one or more wired or wireless networks such as, but not limited to, one or more of an intranet, the Internet, a Local Area Network (LAN), Wireless Local Area Network (WLAN), a Personal Area Network (PAN), Campus Area Network (CAN), a Metropolitan Area Network (MAN), a Wide Area Network (WAN), a Wireless Wide Area Network (WWAN), Global System for Mobile Communications (GSM), Bluetooth, Wi-Fi, LTE networks, and can use one or more messaging protocols such as, TCP/IP, SMS, MMS, extensible messaging and presence protocol (XMPP), real time messaging protocol (RTMP), instant messaging and presence protocol (IMPP), instant messaging, USSD, IRC, and/or any other wireless or wired data network or messaging protocols. Although the communication link 112 can include a publically available network (e.g., the Internet), the kiosks 102 can also connect to and communicate with the kiosk server 106 through a private communication link 113, such as an intranet or other wired or wireless communication network (e.g., a 3G or 4G network, antennae, integrated circuit, Wi-Fi chip, cable, etc.). Moreover, in various embodiments the individual kiosks 102 can be connected to a host computer (not shown) that facilitates the exchange of information between the kiosks 102 and remote computers, other kiosks, mobile devices, etc.

The kiosk server 106 can perform many or all of the functions for receiving, routing and storing electronic messages, such as web pages, audio signals and electronic images necessary to implement various transactions described herein. For example, the kiosk server 106 can retrieve and exchange web pages and other content with an associated database or databases 108. In some embodiments, the database(s) 108 can include information related to kiosk operations, and information related to users of the systems described herein (such as ID information, contact information (email addresses, phone numbers, etc.), selected savings "goals" and associated "rewards," savings balances, consumer accounts, etc.). In various embodiments, the kiosk server 106 can include a server engine, a web page management component, a content management component, and a database management component. The server engine can perform the basic processing and operating system level tasks associated with various technologies described herein. The webpage management component can handle creation and/or display and/or routing of web or other display pages. The content management component can handle many of the functions associated with the routines described herein. The database management component can perform various storage, retrieval and query tasks associated with the database(s) 108, and can store various information and data such as animation, graphics, visual and audio signals, etc. In some embodiments, the network of kiosks 102 and the kiosk server 106 can be controlled and managed by a kiosk operator 110 that can, among other things, provide hardware, software and digital display content for kiosk operations, and service the kiosks 102 to empty the kiosks of coins, replenish consumables, provide maintenance, etc.

In another aspect of the illustrated embodiment, the environment 100 can include one or more merchant entities that comprise a marketplace, e.g., an online marketplace, for providing searchable product content and facilitating online purchases of selected products, etc. For example, the environment 100 includes a retailer, e.g., an online retailer 114, from which users can order, pay for, and receive various types of consumer products, including child-appropriate products such as sports equipment, toys, etc. In some embodiments, Amazon.com is one example of an online retailer, and the present technology can include a plurality of other such retailers that offer a wide variety of different product selections. The online retailer 114 can be operably connected to a retailer server computer 116 ("retailer server 116"), and the retailer server 116 and the online retailer 114 can be operably connected to the kiosks 102 and/or the kiosk server 106 via the communication link 112 and/or other wired or wireless networks. The retailer server 116 can perform many or all of the functions for receiving, routing and storing electronic messages, such as web pages, content, audio signals and electronic images necessary to implement the various transactions described herein relating to online shopping and retailing, including product searching, sorting, reviewing, purchasing, shipping, etc. For example, in some embodiments described below the retailer server 116 can retrieve and exchange web pages and other content with an associated database or databases 118. In some embodiments, the database 118 can include information related to products (e.g., functional details, pricing, availability, reviews, etc.), manufacturers, merchants, consumers, consumer accounts, and the like. For example, the database 118 can maintain data that associates consumers with their personal identification (e.g., username, password, etc.), product orders, payment amounts, electronic contact information (e.g., email addresses, etc.), etc. In various embodiments, the retailer server 116 can include a server engine, a web page management component, a content management component, and a database management component. In some embodiments, the environment 100 can also include additional product/service providers, such as another online retailer 120 that may offer a different product selection than the retailer 114.

In the illustrated embodiment, users (e.g., consumers such as parents and/or their children) may operate various processing devices to receive information from, and exchange information with, one or more of the kiosks 102, the kiosk server 106, the retailer server 116, and/or other communication, computing and processing devices in the environment 100. For example, in the illustrated embodiment users can search for and receive product information (to, e.g., select a product as a savings reward), set savings goals, track saving progress, etc. via a mobile device 104 (e.g., a smartphone), a user computer 122 (e.g., a laptop, desktop, etc.), and/or other user devices executing a consumer application as described herein. As those skilled in the relevant art will appreciate, the mobile device 104 can include various hand-held devices (including mobile phones, smartphones, personal digital assistants (PDAs), wearable computers, all manner of cellular or mobile phones, media players, gaming devices, etc.). Similarly, the user computer 122 can include various types of personal computers, including laptops, desktops, network PCs, mini-computers, mainframe computers, multi-processor systems, microprocessor-based or programmable consumer electronics, set boxes, etc. The user computers may include wireless computers which communicate with the Internet via a wireless link. The computers may be general-purpose devices that can be programmed to run various types of applications, or they may be single-purpose devices optimized or limited to a particular function or class of functions. The mobile device 104 and the user computer 122 can each include a suitable display device, such as an LCD (liquid crystal display), or other suitable display screen for displaying information to the user, and a corresponding touch pad, touch screen, keyboard, pointing device (e.g., a mouse), or other suitable features for receiving user input, e.g., tactile selections. By way of example only, in the illustrated embodiment the mobile device 104 can include one or more features, applications and/or other elements commonly found in smartphones and other known mobile devices. For example, the mobile device 104 can include a CPU and/or a graphics processing unit ("GPU") for executing computer readable instructions stored on memory. In addition, the mobile device 104 can include an internal power source or battery, a dock connector, a USB port, etc. In addition to the foregoing features, the mobile device 104 can include a mobile operating system (OS) and/or a device wireless transceiver that may include one or more antennas for wirelessly communicating with, for example, other mobile devices, websites, the retailer server 116, the kiosk server 106, the kiosk 102, etc. Such communication can be performed via, e.g., the communication link 112, direct wireless communication, etc. As those of ordinary skill in the art understand, the kiosks 102, the server computers 106 and 116, the mobile device 104, and the user computer 122 may include one or more central processing units or other logic-processing circuitry, memory, input devices, output devices (e.g., display devices), and storage devices. Such devices may include program modules such as an operating system, one or more application programs and the like.

In the illustrated embodiment, the kiosks 102, the kiosk server 106, and/or the retailer server 116 can be operably connected to a plurality of remote devices and systems via the communication link 112. For example, the kiosks 102 and/or the servers 106 and 116 can be operably connected to a plurality of user devices (e.g., the mobile device 104 and other handheld devices, the user computer 122 and other personal computers, laptops, etc.) having associated browsers. Similarly, as described below the kiosks 102 can each include wireless communication facilities for exchanging digital information with mobile devices, such as the mobile device 104. As will be understood by those of ordinary skill in the art, the kiosks 102 and/or the servers 106 and 116 can also operably connect to various remote computers for obtaining data and/or exchanging information with service providers, financial institutions, merchants, manufacturers, authorities, government agencies, etc. necessary to implement portions of the technology disclosed herein. The financial institutions can include all manner of entity associated with conducting financial transactions, including banks, credit/debit card facilities, online commerce facilities, online payment systems, virtual cash systems, money transfer systems, etc.

The various components and component arrangements depicted in FIG. 1 are merely illustrative of an embodiment of the present technology. Unless described otherwise, the construction and operation of the various components shown in FIG. 1 are of conventional design. As a result, such components need not be described in further detail herein, as they will be readily understood by those skilled in the relevant art. Aspects of the invention may be practiced in a variety of other computing environments. Accordingly, other embodiments can include additional components. For example, those of ordinary skill in the art will understand that embodiments of the environment 100 can further include and/or be connectable to other entities, such as additional retailers, digital content providers, financial institutions for reconciling purchases (e.g., banks, credit/debit card providers, accounting clearing houses), and/or other associated computer systems as necessary to implement electronic commerce and/or other aspects of the methods and systems described herein. Additionally, in other embodiments the environment 100 may lack one or more of the components shown in FIG. 1. Further, in some embodiments the various functions described herein with respect to one of the servers 106 and 116 can be performed by the other one of the servers 106 and 116, or by another server or computing device. In other embodiments, the functions of both servers 106 and 116 may be combined in a single server, or divided among multiple other servers and/or other resources. Similarly, although the kiosk operator 110 and the retailer 114 are depicted as separate entities in FIG. 1 for purposes of illustration, in other embodiments these two entities can be a single entity, and/or the various functions of each can be performed by the other, and/or by other entities. For example, in other embodiments all or a portion of the functions performed by the retailer server 116 can be performed by a server controlled by the kiosk operator 110.

Figure 2:
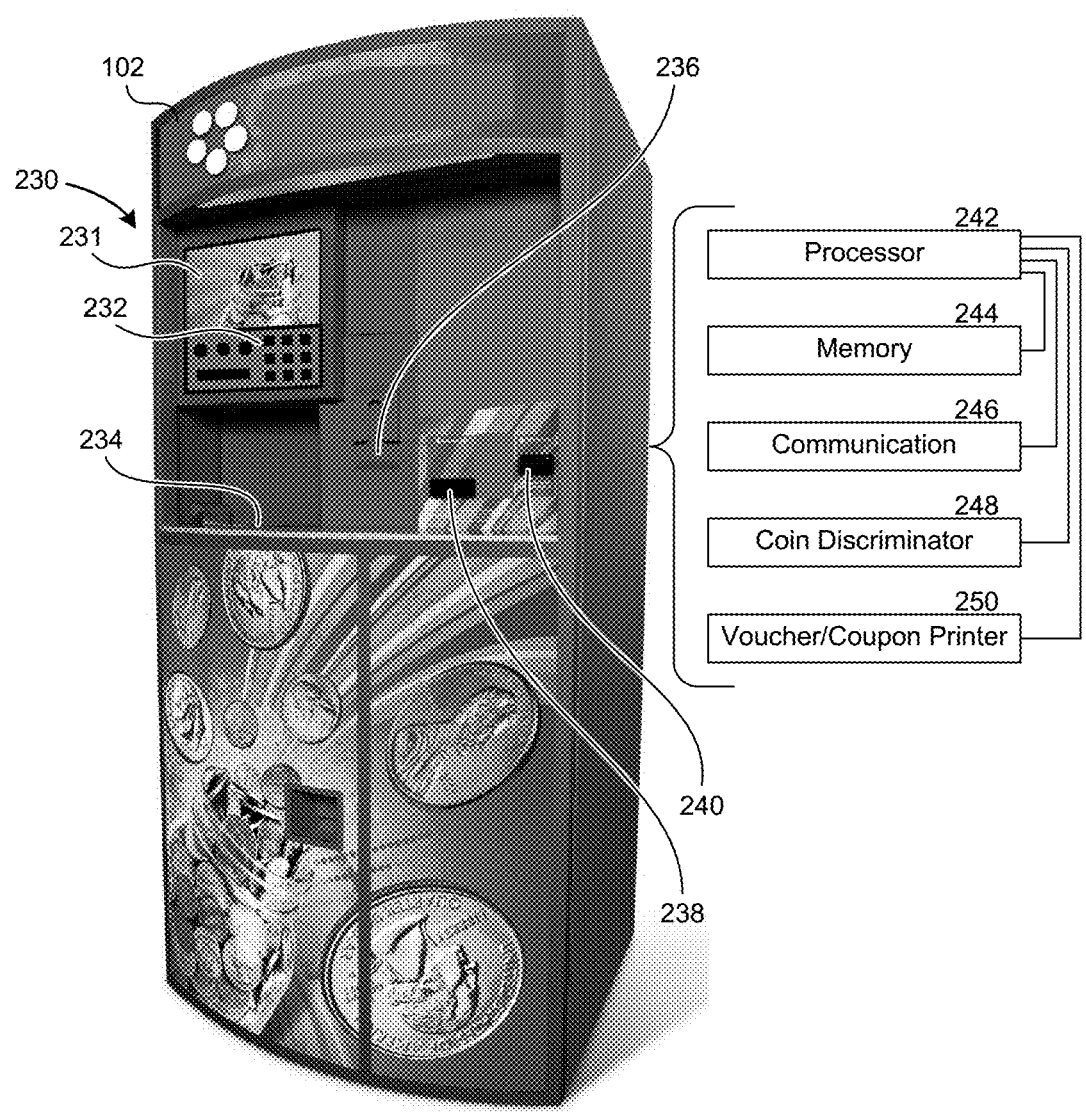
FIG. 2 is a partially schematic isometric view of a consumer-operated coin counting kiosk configured in accordance with an embodiment of the present technology.

FIG. 2 is a partially schematic isometric view of one of the kiosk 102a-102n of FIG. 1 configured in accordance with an embodiment of the present technology. In some embodiments, the kiosks 102a-102n can be consumer-operated coin counting kiosks that are located in, for example, retail outlets (e.g., grocery stores, drug stores, etc.) banks, and/or other publically-accessible areas. Additionally, in some embodiments each of the kiosks 102 can be at least generally similar in structure and function to each other. In other embodiments, however, the kiosks 102 may differ from each other in various structural and/or functional ways.

In the illustrated embodiment, the kiosk 102 is at least approximately the same size as a conventional food or soft drink vending machine, and includes a user interface 230. The user interface 230 can include a display screen 231 and a keypad 232. The display screen 231 can present prompts and other textual and graphical information to users to facilitate the coin counting process, and can include a touch screen or touch pad with which users can input information (e.g., user IDs, passwords, unique codes, etc.) in response to prompts displayed on the screen 231. The keypad 232 can include a plurality of tactile buttons that users can also use to input information in response to the prompts displayed on the screen 231.

The kiosk 102 includes a coin input region in which users can pour or otherwise place a plurality of loose coins for counting. In the illustrated embodiment, the coin input region 234 includes a hinged tray in which the user may pour their coins and then lift one side of the tray to cause the coins to flow into the kiosk 102. In other embodiments, other types of coin input devices and systems can be included with the kiosk 102. The kiosk 102 can house a coin discriminator 248 (shown schematically) for discriminating and counting the coins input by the user to determine a total value. The kiosk 102 additionally houses a voucher/coupon printer 250 (also shown schematically) for printing vouchers, coupons, receipts and/or other printed indicia associated with coin counting transactions that are dispensed to the user via a voucher/coupon outlet 236. In some embodiments, the user can supplement the coin value by providing additional funds to the kiosk 102. For example, the user can provide cash funds via a bill acceptor 240, and credit or debit value via a card reader 238 that can read, e.g., a magnetic stripe, optical indicia, etc. on a corresponding credit or debit card input by the user.

In addition to the foregoing features, the kiosk 102 can further include a central processor 242 (e.g., a CPU), memory 244 and a communication facility 246. The processor 242 can provide information and instructions to kiosk users via the display screen 231 and/or an associated audio system (e.g., a speaker; not shown). The processor 242 can also receive user inputs via, e.g., a touch screen associated with the display screen 231, the physical keys of the keypad 232, and/or a microphone. The processor 242 can control the operation of the various electronic and electromechanical components of the kiosk 102 in accordance with computer-readable instructions stored on the memory 244. The processor 242 may be any logic processing unit, such as one or more CPUs, digital signal processors (DSPs), application-specific integrated circuits (ASICs), etc. The processor 242 may be a single processing unit or multiple processing units in a device or distributed across multiple devices. The processor 242 is connected to the memory 244 and may be coupled to other hardware devices, for example, with the use of a bus (e.g., a PCI Express or Serial ATA bus). The processor 242 can include, by way of example, a standard personal computer ("PC") (e.g., a DELL OPTIPLEX 780 or 7010 PC) or other type of embedded computer running any suitable operating system, such as Linux, Windows, Android, iOS, MAC OS, or an embedded real-time operating system. In some embodiments, the processor 242 can be a small form factor PC with integrated hard disk drive ("HDD") or solid-state drive ("SSD") and universal serial bus ("USB") or other ports to communicate with the other components of the kiosk 102. The memory 244 can include read-only memory (ROM) and random access memory (RAM) or other storage devices, such as disk drives or SSDs, that store the executable applications, test software, databases and other software required to, for example, implement the various kiosk routines described herein, control kiosk components, process information and data, communicate and exchange data and information with remote computers and other devices, etc.

The kiosk 102 can communicate with the various processing devices illustrated in FIG. 1 (e.g., remote servers, user devices, etc.) via the communication facility 246. The communication facility 246 can include a network connection (e.g., a wired connection, such as an Ethernet port, cable modem, FireWire cable, Lightning connector, USB port, etc.) and/or a wireless transceiver (e.g., including a Wi-Fi access point, Bluetooth transceiver, near-field communication (NFC) device, and/or wireless modem or cellular radio utilizing GSM, CDMA, 3G and/or 4G technologies) suitable for communication with, e.g., all manner of remote processing devices via, e.g., the communication link 112 and/or directly via, e.g., a wireless peer-to-peer connection. The kiosk 102 and/or various components and systems thereof can be at least generally similar in structure and function to the kiosks and corresponding kiosk components and systems described in the following U.S. patents and patent applications, each of which is incorporated herein in its entirety by reference: U.S. patent application Ser. Nos. 13/671,299, 13/367,129, 13/728,905, 13/790,674, 14/312,393, 14/617,672 and 14/674,860; and U.S. Pat. Nos. 5,564,546, 5,620,079, 6,056,104, 5,842,916, 6,116,402, 6,349,972, 8,033,375, 7,653,599, 7,865,432, 7,014,108, 9,064,268, 8,874,467, 8,967,361 and 9,022,841.

Figure 3:
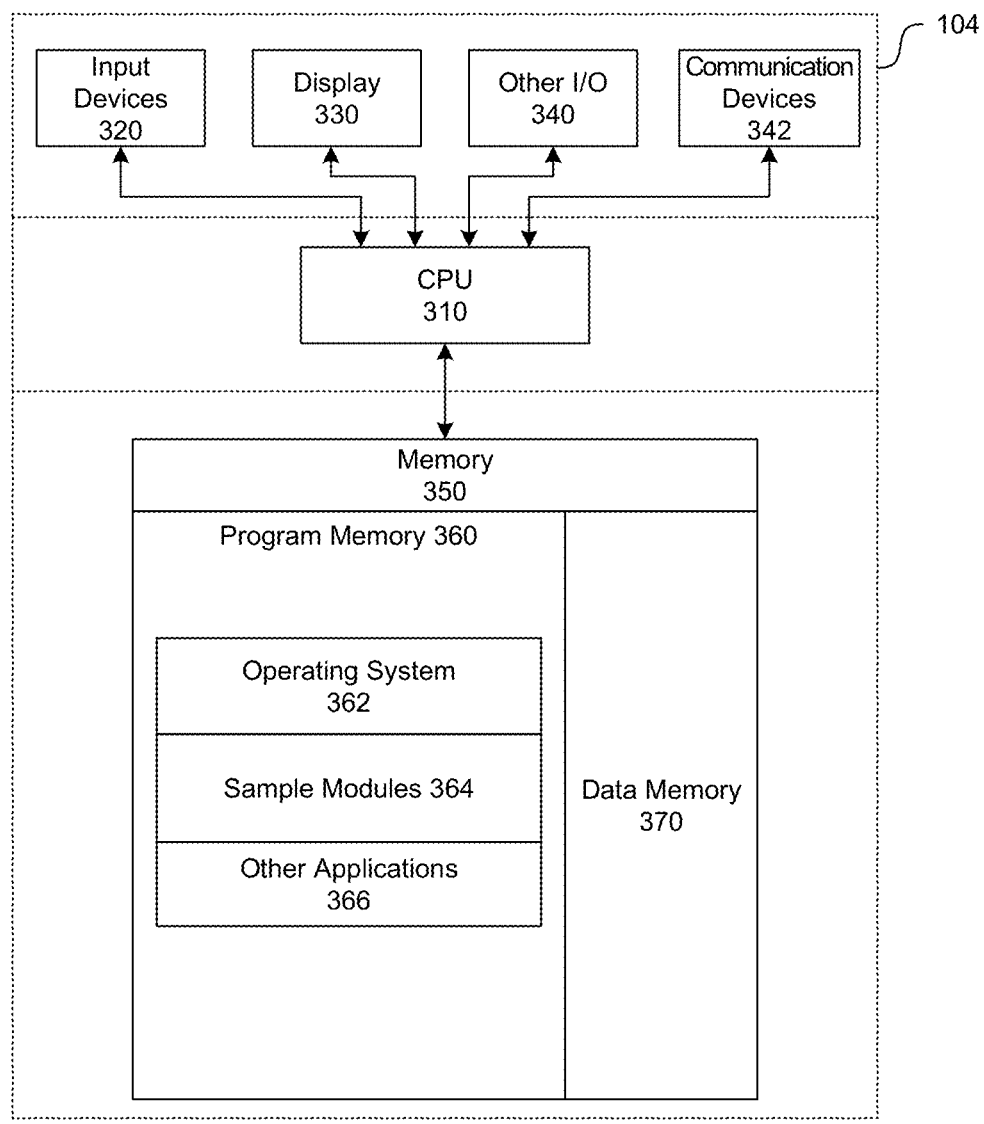
FIG. 3 is a block diagram illustrating components of a mobile device on which some implementations of the disclosed technology can operate.

FIG. 3 is a block diagram illustrating an overview of the mobile device 104 on which some implementations of the disclosed mobile application and associated technology can operate. The mobile device 104 can comprise hardware components that execute the mobile application and associated modules. The mobile device 104 can include one or more input devices 320 that provide input to a CPU (processor) 310, notifying it of actions. The actions can be mediated by a hardware controller that interprets the signals received from the input device and communicates the information to the CPU 310 using a communication protocol. The input devices 320 can include, for example, a mouse, a keyboard, a touchscreen, an infrared sensor, a touchpad, a wearable input device, a camera or image-based input device, a microphone, or other user input devices.

The CPU 310 can be a single processing unit or multiple processing units in the device or distributed across multiple devices. The CPU 310 can be coupled to other hardware devices, for example, with the use of a bus, such as a PCI bus or SCSI bus. The CPU 310 can communicate with a hardware controller for devices, such as for a display 330. The display 330 can be used to display text and graphics. In some examples, the display 330 provides graphical and textual visual feedback to a user. In some implementations, the display 330 includes the input device 320 as part of the display, such as when the input device 320 is a touchscreen or is equipped with an eye direction monitoring system. In some implementations, the display 330 is separate from the input device 320. Examples of display devices include: an LCD display screen, an LED display screen, a projected display (such as a heads-up display device or a head-mounted device), and so on. Other I/O devices 340 can also be coupled to the CPU 310, such as a network card, video card, audio card, USB, firewire or other external device, camera, printer, speakers, CD-ROM drive, DVD drive, disk drive, or Blu-Ray device. In some embodiments, the mobile device 104 also includes communication devices 342 capable of communicating wirelessly or wire-based with a network node. The communication devices 342 can communicate with another device or a server through a network using, for example, TCP/IP protocols. The mobile device 104 can utilize the communication devices 342 to distribute operations across multiple network devices.

The CPU 310 has access to a memory 350. A memory includes one or more of various hardware devices for volatile or non-volatile storage, and can include read-only or writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. The memory 350 includes program memory 360 that stores programs and software, such as an operating system 362, mobile app modules 364, and any other application programs 366. The memory 350 also includes data memory 370 that can include location data; savings data; product data; user profiles, favorite products, favorite kiosks, monitored activities, rewards earned, promotions earned, promotions used, purchase history, consumer kiosk usage reporting data; special promotions, and other notifications, configuration data, settings, and user options or preferences which can be provided to the program memory 360 or any element of the mobile device 104.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, and the like.

Figure 4:
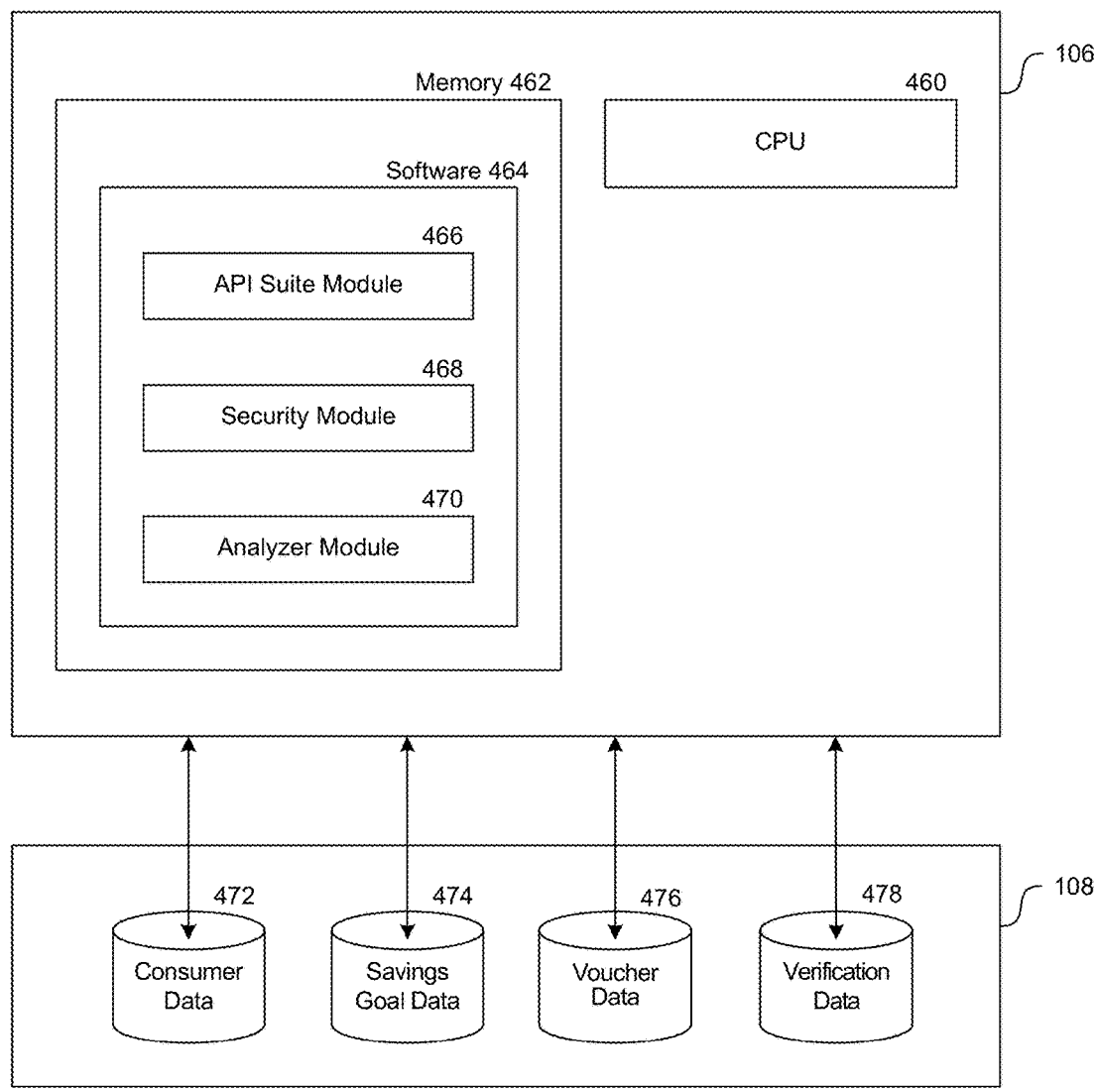
FIG. 4 is a block diagram illustrating components of a server computer on which some implementations of the disclosed technology can operate.

FIG. 4 is a block diagram illustrating a representative embodiment of the kiosk server 106 configured in accordance with an embodiment of the present technology. In the illustrated embodiment, the kiosk server 106 includes one or more central processing units (CPU) 460 for executing software 464 stored in memory 462. The software 464 can include one or more modules and data utilized by the modules. The modules can perform various functions and methods of the kiosk server 106 described herein and may also include components, subcomponents or other logical entities that assist with or enable the performance of some or all of these functions and methods. In the illustrated embodiment, the software 464 includes an API suite module 466 that provides a software-to-software interface that allows applications (e.g., mobile device applications, kiosk applications, retailer applications, etc.) and programs (e.g., kiosk software, online retailer software, mobile device software, and/or other software, etc.) to communicate with the kiosk server 106. The API suite module 466 can include one API or multiple APIs. For example, in some embodiments the API suite module 466 can include an API for accessing coin counting transaction information, and API for accessing various types of consumer product information, pricing, etc., an API for accessing and/or verifying consumer information, an API for tracking savings information, etc. Accordingly, in some embodiments each API in the API suite module 466 can serve a different function. The APIs may exchange electronic communications back and forth between various applications for the kiosk server 106 and the other processing devices in the environment 100 of FIG. 1 (e.g., the kiosk database 108, the kiosks 102, the retailer server 116, etc.), and these calls may be managed through Web services. Web services may include Extensible Markup Language (XML), which is one programming language by which applications can communicate over the Internet. In some embodiments, the API suite module 366 may use Simple Object Access Protocol (SOAP), which can encode XML messages so that they can be received and understood by multiple different operating systems over any type of network protocol. The API suite module 466 may also use Universal Description, Discovery, and Integration (UDDI) as an XML-based directory that allows businesses to list themselves, or it may use Web Services Description Language (WSDL).

The software 464 can also include a security module 468 that maintains secure and authentic communications between the kiosk server 106, the kiosks 102, the retailer server 116, and/or other processing devices in the environment 100. In this regard, the security module 468 may comprise any combination of software agents and/or hardware components to filter such communications. The security module 468 can also implement other features. For example, if a user enters a unique code via a user device (e.g. the mobile device 104, the user computer 122, etc.) to, for example, update a savings amount, and the device transmits the code to the kiosk server 106, the security module 468 can ensure that the code has not already been used and prevent the code from being duplicated for use more than once. Accordingly, in some embodiments the security module 468 can perform functions related to verifying a consumer's identity, verifying coin exchange transactions, etc.

In another aspect of the illustrated embodiment, the representative software 464 can also include an analyzer module 470 that receives, reviews, and/or responds to queries and requests that may come from other modules or components of the environment 100. Additionally, in some embodiments the analyzer module 470 can process and analyze user information, such as user purchase preferences, user coin accumulation rates and other habits, user purchase histories, user notification requests, etc. Embodiments of the analyzer module 470 can include any combination of software agents and/or hardware components to perform such processes.

The kiosk server 106 can access the database 108 and/or other databases to perform all or a portion of the various routines described herein. As illustrated in FIG. 4, the database 108 can include, for example, consumer data 472, savings data 474, voucher data 476, and verification data 478. The foregoing databases are accessible by and can exchange information and data with the modules described above, and the modules can in turn store information in the various databases or update the information in these databases continuously, periodically or sporadically. By way of example, the consumer data 472 can include various informational items such as user account information, consumer names, email addresses, phone numbers, coin exchange histories, saving history, notification requests, etc. The savings data 474 can include information about users' savings goals (such as the dollar value of set goals, current savings totals, etc.), selected reward products, and/or other information related to the savings programs disclosed herein. The voucher data 476 can include information related to coin exchange transactions, such as the dollar value of particular coin exchange transactions (i.e., coin "pours"), the cash redemption value of associated vouchers, associated unique codes for remotely tracking savings totals, etc. The verification data 478 can include information necessary to verify, for example, consumer identities, unique codes, etc. For example, the verification data can include unique codes that correspond to particular coin pours. The verification data 478 can also include user passwords, email addresses, credit and debit card information, and/or other similar information for verifying the identity of users. As those of ordinary skill in the art will appreciate, the various components of the kiosk server 106 and the associated databases 472-478 described above are representative of server systems that can be configured in accordance with embodiments of the present technology. Accordingly, in other embodiments other types of server and database architectures can be employed to perform the various functions and methods described herein without departing from the present disclosure.

Figure 5:
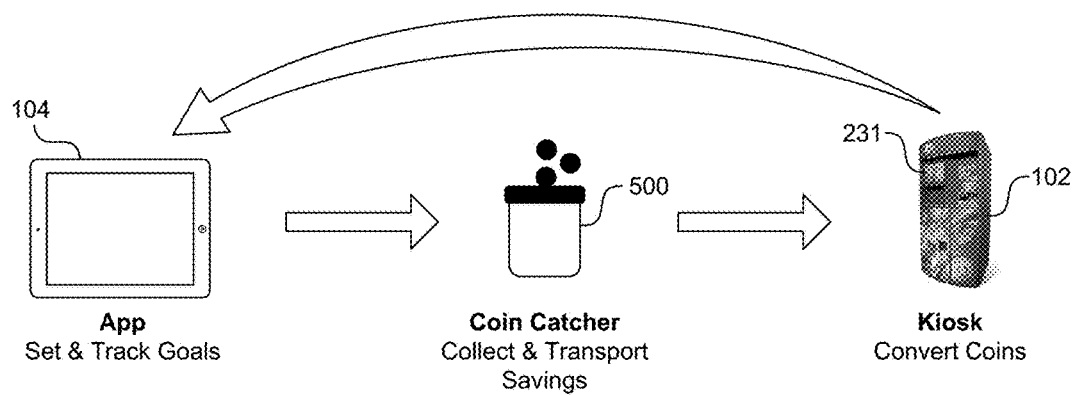
FIG. 5 illustrates an overview of a system for saving coins and setting purchase goals in accordance with an embodiment of the present technology.

FIG. 5 illustrates an overview of a coin saving system configured in accordance with an embodiment of the present technology. In the illustrated embodiment, the system can include a user device, such as the mobile device 104 (and/or the user computer 122), for implementing an application (e.g., a mobile app) that enables the user (e.g., a child) to search for products in an online marketplace, select a product (a "reward") for purchase, and set a savings goal to be applied toward the purchase price of the product. The application can also enable the user to track their progress toward the savings goal as they periodically exchange their saved coins (for, e.g., a cash voucher) at a coin-counting kiosk 102, and can provide the user with a notification when the savings goal is met. In addition to these features, the application can also include other content and navigation elements. For example, the application can include various kid-friendly content that engages children in the savings process through games provided via the app, and can push notifications of items that may interest the child, etc. Such game functionality can include avatars and "badges" that the child can earn for achieving various savings thresholds. The badges can be used to digitally "purchase," e.g., clothes, powers, and other digital rewards which the child can apply to his/her avatar.

In addition to the application, the coin savings systems described herein can also include various embodiments of coin savings containers for collecting and transporting coin savings, as described in greater detail below with reference to FIGS. 6A and 6B. When the child wishes to exchange the saved coins for cash and see how much they saved, the coins can be exchanged for, e.g., a redeemable cash voucher at one of the coin counting kiosks 102. As described in greater detail below, the kiosk 102 can display kid-friendly content on the display screen 231 during the coin exchange transaction to engage the child in the coin exchange process. Additionally, the voucher can include a unique code, or a unique code can be emailed to the child or parent, which the child or parent can then input into the application on the mobile device 104 to update the child's coin savings total and track the child's progress toward his or her savings goal.

Figure 6A:
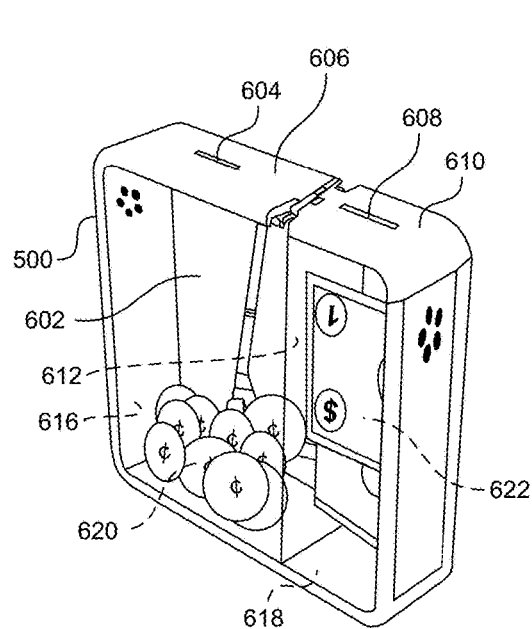
FIGS. 6A and 6B are isometric views of a coin savings container configured in accordance with an embodiment of the present technology.
Figure 6B:
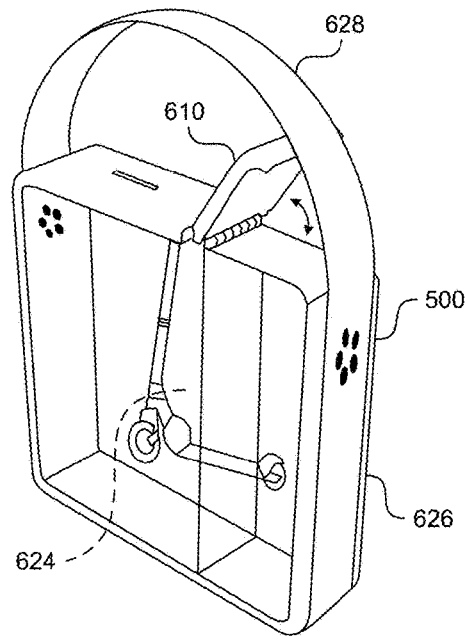

FIGS. 6A and 6B are isometric views of the coin savings container 500 configured in accordance with an embodiment of the present technology. Referring to FIGS. 6A and 6B together, in the illustrated embodiment, the coin savings container 500 includes an internal partition 612 that divides the interior of the container 500 into a coin compartment 616 and a bill compartment 618. The container 500 further includes a first top portion 606 having a coin slot 604, and a second top portion 610 having a bill slot 608. The coin slot 604 enables a child to deposit a plurality of coins 620 into the coin compartment 616 for saving. Similarly, the bill slot 608 enables the child (or parent) to deposit paper currency 622 (e.g., bills from coin amounts that the child has already converted via the coin counting kiosk 102) into the bill compartment 618 for saving. In the illustrated embodiment, the container 500 can further include a transparent front wall 602 that enables the child to see the quantity of the coins 620 and the bills 622 that he or she has saved. Additionally, the container 500 can be configured to hold and display a picture 624 (e.g., a picture of the product "reward" that the child is saving to purchase) on an interior side of a rear wall 626 to remind the child of their savings goal. As shown in FIG. 6B, each of the top portions 606 and 610 is configured to pivot upwardly about a hinge to enable the child to pour the save coins or cash out of the container 500, such as to pour the coins into the coin counting kiosk 102 to convert the coins into cash. The container 500 can also include a convenient carrying strap 628.

Figure 7A:
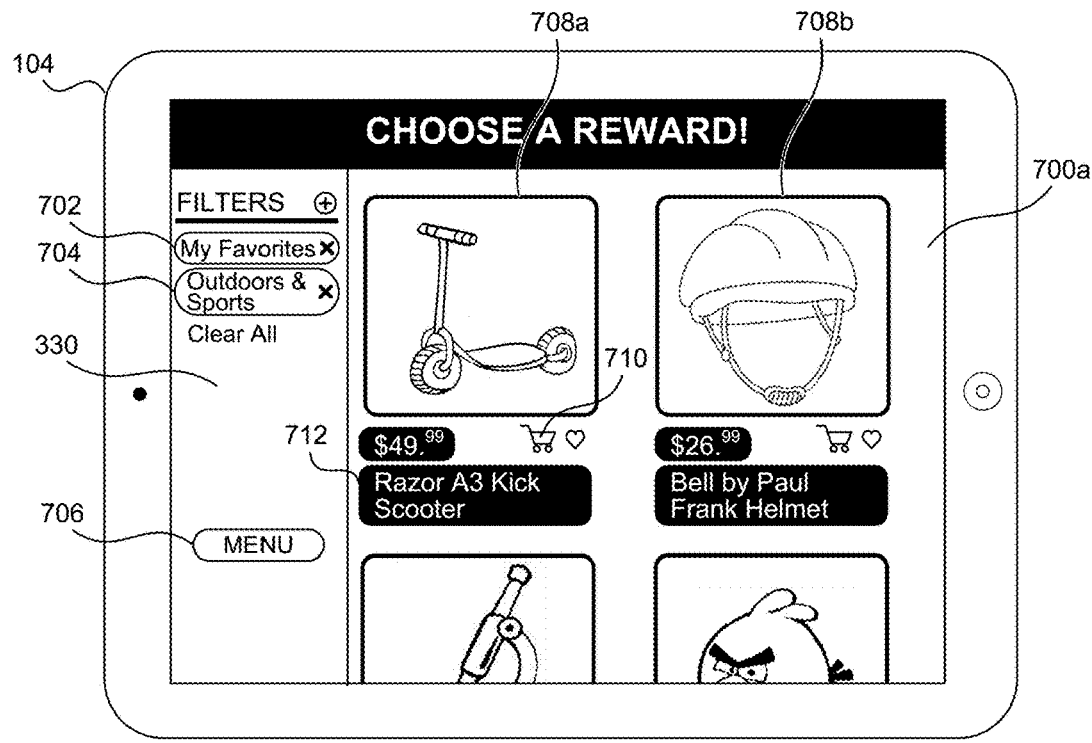
FIGS. 7A and 7B illustrate example display pages for receiving a product selection and a savings goal, respectively, from a user in accordance with an embodiment of the present technology.
Figure 7B:
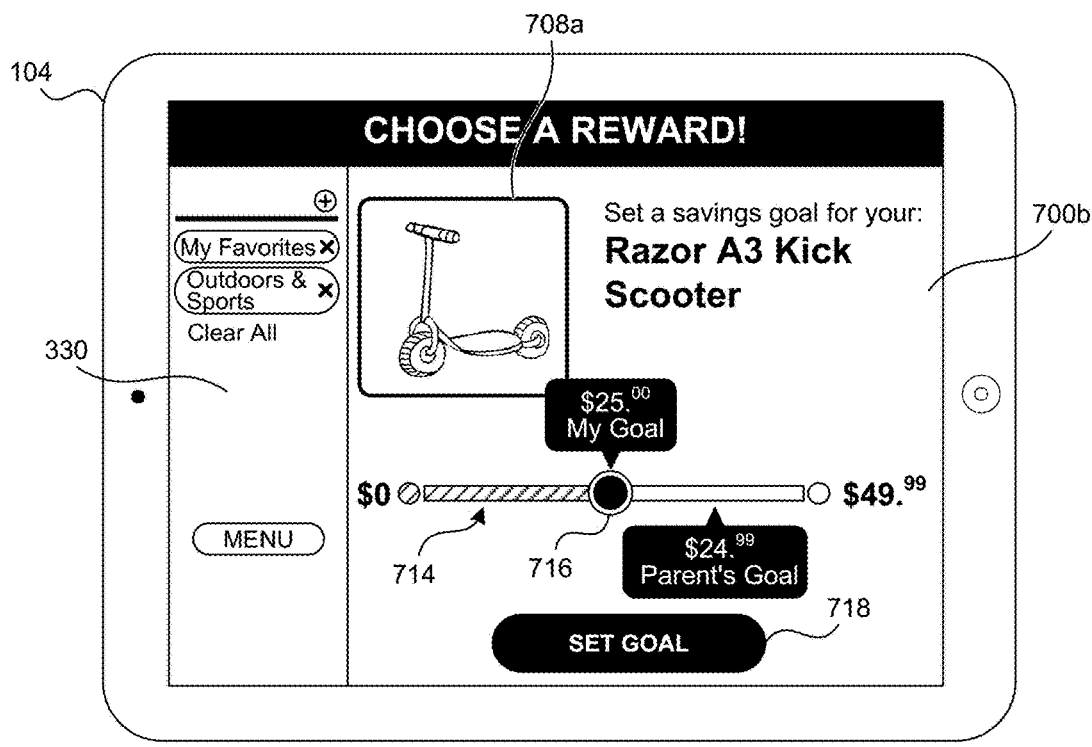

FIGS. 7A and 7B are example screenshots of display pages 700*a* and 700*b*, respectively, of an application executing on a user device (e.g., the mobile device 104) to implement portions of the disclosed technology. More specifically, in some embodiments, an application (e.g., a mobile app) configured in accordance with the present technology can present the display pages 700*a*, *b* on a display screen of the user device to enable a user (e.g., a child, parent, or the child and parent) to select a savings reward (e.g., a desired product) and set a savings goal. Although parents can perform many of the steps described herein on behalf of their children as part of a learning experience, it should be understood that a wide variety of other people can also perform these steps, such as grandparents, aunts, uncles, and other family members; family friends, teachers; etc. Referring first to FIG. 7A, the display page 700*a* can include various content and site navigation features. For example, the display page 700*a* can include a plurality of product graphics 708*a* and 708*b*. In the illustrated embodiment, the product graphics 708 show products that a child might be interested in having, such as a scooter or a bike helmet. Additionally, the display page 700*a* includes textural information about each product such as the product price, as well as a selector button 712 and a shopping cart 710 associated with each product. The display page 708*a* can also include a number of graphical control elements or navigation features typically found on online retailer web pages that enable the user to search for various products in different categories, identified products as "favorites", etc. For example, the display page 700a can include a menu button 706 which, if selected, can bring up a search page that enables the user to search for various products in selected categories, price ranges, etc. Additionally, the display page 700a can include a number of control elements that enable the user to filter the presented product choices. For example, the display page 700a includes a first filter indicator 702 indicating that the displayed products are "favorites" of the user, and a second filter indicator 704 indicating that the displayed products are in the "outdoors and sports" category.

As described in greater detail below, in some embodiments the products offered via the display page 700a can be provided by one or more online retailers who provide a digital interface with the mobile application. For example, in some embodiments the online retailers can provide digital access to the retailers' product selection and discovery functionality so that the provider of the mobile app (e.g., the kiosk operator) can advertise products and facilitate purchase of those products via the mobile application. For example, in some embodiments the online retailer can provide an application program interface (API) that enables the mobile app to provide product search and look-up capability provided by the online retailer. One example of such an API is the Amazon.com, Inc. Product Advertising API. In other embodiments, the display page 700a can provide product search capability via other means, such as providing a dedicated search engine, or sourcing a selection of products that are only offered via the savings program described herein. Although the product content and search functionality may come from one or more product retailers, the display page 700a can be presented with graphics, logos, etc. that associate the display page with the entity offering the savings application (e.g., the kiosk operator) so that the user has a consistent experience when using the various user interfaces described herein.

Once the user has found a product he or she would like to have as a savings reward, he or she can select the product by tapping the corresponding product selector button 712. Selecting the Razor Scooter on the display page 700a, for example, brings up the display page 700b shown in FIG. 7B. In the illustrated embodiment, the display page 700b again includes the graphic 708a of the selected product, as well as a savings goal selector 714. In the illustrated embodiment, the savings goal selector 714 includes a horizontal scale to represent the price of the selected product (e.g., $49.99). A slider button 716 can be moved back and forth along the scale by the user (by, e.g., touching and dragging the button) to set the desired savings goal. In the illustrated embodiment, for example, the user has set the savings goal at $25.00 against the product purchase price of $49.99. For example, a parent may set the goal of $25.00 with the understanding that when the child saves $25.00, the parent will purchase the reward for the child by contributing the balance of $24.99 toward the purchase price. Once the parent and child agree on the savings goal, the parent or child can set the goal by tapping a set goal button 718.

In addition to the foregoing features, the display page 700b can also include other content, graphical control elements or user input features. For example, the display page 700b, or an associated display page, can include one or more fields that enable a user (e.g., a child and/or a parent) to enter identification information such as a name, email address, phone number, password, etc. Such information can be used to establish a user account for the user that can be used to access information associated with the user (e.g., savings data, goals, product information, etc.) from a remote computer (e.g., the kiosk server 106) to implement various portions of the technology disclosed herein. Entering an email address, for example, can enable the user to receive emails when, for example, they achieve their savings goal, as well as other email notifications of, for example, available products, etc. Additionally, after the savings goal is set, the parent or child can receive an email with a picture of the selected product (e.g., the scooter) for inserting into the coin savings container 500 described above with reference to FIGS. 6A and 6B.

Figure 8:
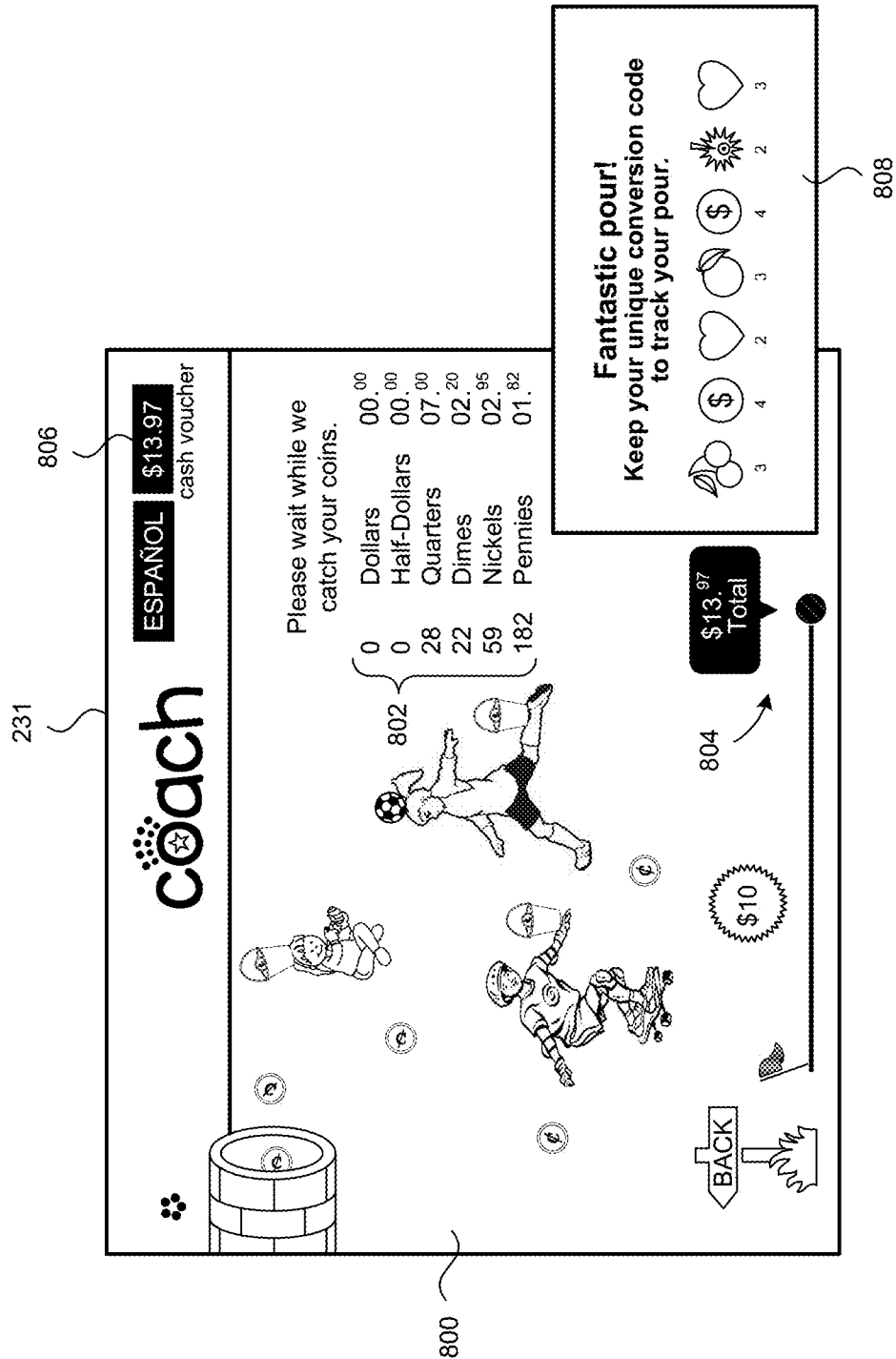
FIG. 8 illustrates a display page for providing information associated with a consumer coin counting transaction, in accordance with an embodiment of the present technology.

FIG. 8 illustrates a display page 800 that can be presented on the display screen 231 of the kiosk 102 to guide and inform a child (or other user, such the child's parent) as he or she is converting their saved coins into, for example, a redeemable cash voucher. In some embodiments, for example, the user can be presented (via, e.g., the display screen 231) with a variety of different transaction options when first approaching the kiosk 102, and one of the options can correspond to the child savings program described herein. Selecting that option causes the kiosk 102 to provide the display page 800. As described above with reference to FIG. 2, the child can pour his or her coins (from, e.g., the coin savings container 500) into the coin input region 234 of the kiosk 102 to start the coin counting process. As the coins are being counted, the total of each denomination counted can be displayed in a transaction field 802. Additionally, the display page 800 can include a coin value indicator 804 that includes text and/or a graphic feature indicating the total value of the coins counted in the transaction (e.g., $13.97). The user can elect to have the coin value exchanged for or applied to a number of different types of output. For example, in some embodiments the user can elect to receive a redeemable cash voucher, an e-certificate, a gift card, or a money transfer, etc., for the coin value. For the voucher option, the display page 800 includes a voucher value indicator 806 that textually displays the redeemable cash value of the voucher. In some embodiments, the redeemable cash value can be equal to the total value of coins counted (e.g., $13.97, as shown in FIG. 8). In other embodiments, the redeemable cash value can be less than the total value of the coins. For example, the voucher may have a redeemable cash voucher that is equal to the total value of the coins minus a service fee (e.g., a service fee of about 10% or less). If the user selects the voucher option, the voucher is dispensed to the user from the voucher outlet 236 (FIG. 2). In some embodiments, the display page 800, or a subsequent display page presented by the kiosk 102, can include a code field 808 that provides the user with a unique code (e.g., 3423423) associated with the coin exchange transaction. In other embodiments, the unique code can be printed on the redeemable voucher, a receipt or other paper record, and/or the code can be emailed to the child and/or the parent. As described in greater detail below, the user can input the unique code into the mobile application described herein to update their savings total and track their savings progress.

Figure 9A:
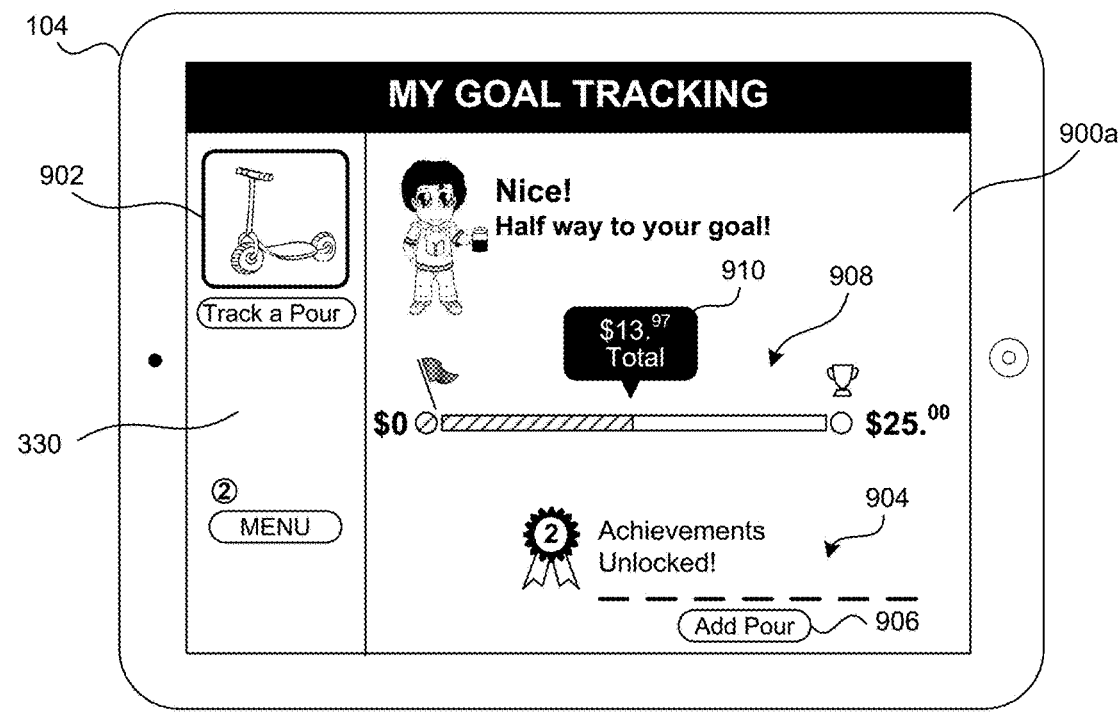
FIGS. 9A and 9B illustrate display pages for tracking a savings goal and providing notification that a savings goal was achieved, respectively, in accordance with an embodiment of the present technology.
Figure 9B:
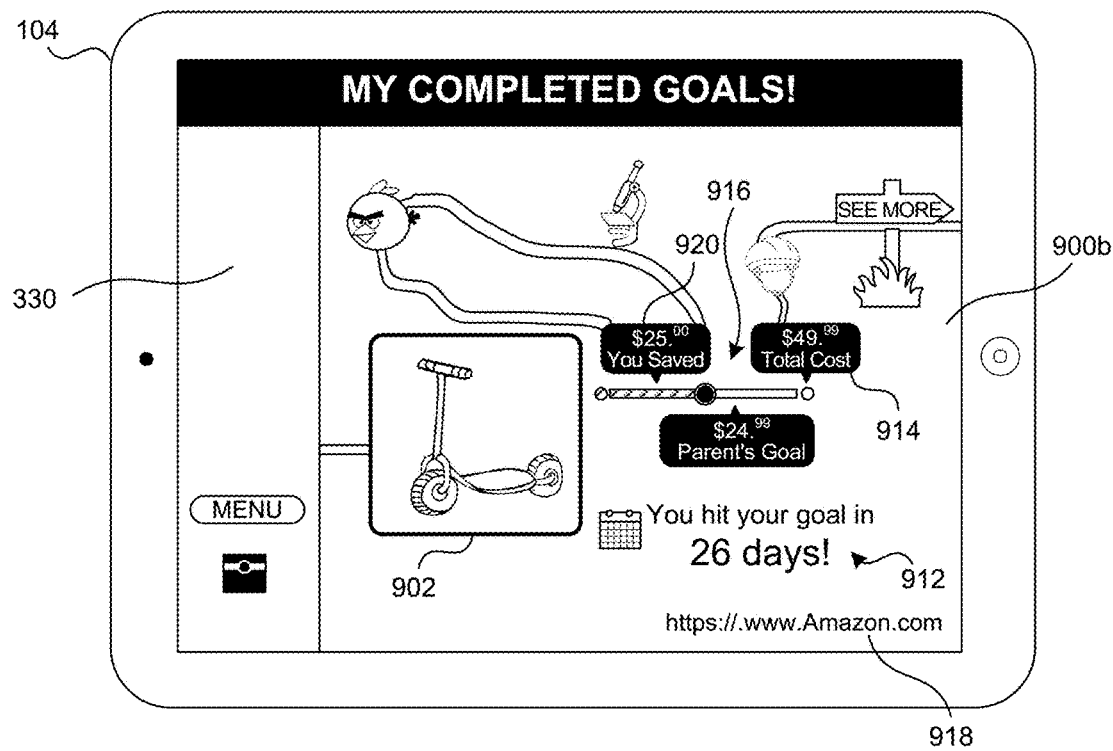

FIGS. 9A and 9B are example screenshots of display pages 900a and 900b, respectively, of an application executing on a user device (e.g., the mobile device 104) to implement portions of the disclosed technology. More specifically, in the illustrated embodiment the display pages 900a and 900b can be provided on the display 330 of the mobile device 104 to track a child's savings progress. As those of ordinary skill in the art will understand, in some embodiments the display pages 900a and 900b can be provided after the user has selected an appropriate icon on the user interface of their device to open the application, and input his or her user account information (e.g., username, password, etc.), or the user account may be associated with the user device such that it is unnecessary for the user to input account information each time he or she uses the device. Referring first to FIG. 9A, in the illustrated embodiment the display page 900a includes a goal graphic 902 that represents the selected product, a savings tracker 908, and a code field 904. After a child has exchanged his or her savings at the coin counting kiosk 102, he or she can add the coin value from the exchange to their total savings by inputting the unique code from the coin counting transaction into the code field 904. In some embodiments, for example, the user can input the code by use of an associated numeric touchpad. After the user has input the code, they can tap an "Add Pour" button 906 to retrieve the value associated with the recent coin exchange transaction (e.g., $13.97). For example, as described in greater detail below, in some embodiments the mobile device 104 can send the code to a remote computer, such as the kiosk server 106, to query or otherwise request the coin value associated with the code. The server can obtain the coin value from an associated database and send the coin value back to the savings application on the mobile device 104, which can add the new coin value to any existing amount the child had previously saved and display the new total via a savings indicator 910. In the illustrated embodiment, the goal tracker 908 includes a horizontal scale ranging from $0 to the savings goal set by the child (e.g., $25.00), and the savings indicator 910 is positioned at the appropriate location on the horizontal scale to accurately represent the child's progress in reaching his or her saving goal. In this example, the child had no previous savings, so the total savings is equal to the $13.97 from the child's initial coin exchange transaction.

Referring next to FIG. 9B, once the child has reached the savings goal, the mobile device 104 can notify the user via, for example, the display page 900b. In the illustrated embodiment, the display page 900b can include various types of content associated with the child's savings achievement, such as an elapsed time indicator 912 that textually indicates how many days it took the child to reach the savings goal. The display page 900b can also include a completed goal graphic 916 that includes a horizontal bar with a total price indicator 914 representing the total price of the selected product (e.g., $49.99), as well as a goal indicator 910 representing the portion paid by the child's savings (e.g., $25.00). Additionally, in some embodiments, the display page 900b can also include a link 915 to a website that the parent can access to purchase the selected product for the child as the reward. For example, tapping on the link can bring up the retailer's website and enable the parent to then purchase the desired product with a credit card or similar financial instrument.

The various display pages described above illustrate some example display pages that can be implemented by, for example, a savings application configured in accordance with the present technology to encourage and facilitate savings by children. As those of ordinary skill in the art will recognize, in other embodiments other display pages providing other content, navigation features and/or graphic control elements can be used to implement the various methods and systems described herein without departing from the spirit or scope of the present disclosure.

As described above, in some embodiments a child can pick out a reward and set a savings goal using an application as described herein. As the child accumulates coins, the child and/or his or her parent can periodically take the coins to one of the coin counting kiosks 102 to exchange them for, e.g., a redeemable cash voucher. The parent may then exchange the voucher for a cash value that, in some embodiments, may be less than the total value of coins counted by the kiosk (e.g., the voucher may have a value that is equal to the value of coins counted minus a service fee). The cash can then be saved, e.g. in the coin savings container 500 described above with reference to FIGS. 6A and 6B, until the savings goal is met, at which time the cash can be applied towards the purchase price of the selected reward product. (In other embodiments, the parent may elect to keep/spend the cash and then purchase the reward with other funds (e.g., a credit card) when the child reaches the savings goal.) Although the redeemable cash value of the voucher may be less than the total value of the coins exchanged at the kiosk, it should be noted that in one aspect of the present technology the application applies 100% of the exchanged coin value to the child's savings total. This enables the child to have 100% of the value of the coins they saved be applied to the purchase price of their desired reward, and the parent can make up any shortfall in the balance of the purchase price caused by the voucher service fee.

The display pages of FIGS. 7A-9B may be implemented in any of various ways, such as in C++ or as web pages in XML (Extensible Markup Language), HTML (HyperText Markup Language) or any other scripts or methods of creating displayable data, such as the Wireless Access Protocol ("WAP"). The screens or web pages provide facilities to present information and receive input data, such as a form or page with fields to be filled in, pull-down menus or entries allowing one or more of several options to be selected, buttons, sliders, hypertext links or other known user interface tools for receiving user input. While certain ways of displaying information to users is shown and described with respect to certain Figures, those skilled in the relevant art will recognize that various other alternatives may be employed. The terms "display page," "screen," "web page" and "page" are generally used interchangeably herein.

When implemented as web pages, the screens are stored as display descriptions, graphical user interfaces, or other methods of depicting information on a computer screen (e.g., commands, links, fonts, colors, layout, sizes and relative positions, and the like), where the layout and information or content to be displayed on the page is stored in a database typically connected to a server. In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector generated), or matrix or bit-mapped formats. While aspects of the invention are described herein using a networked environment, some or all features may be implemented within a single-computer environment.

Figure 10:
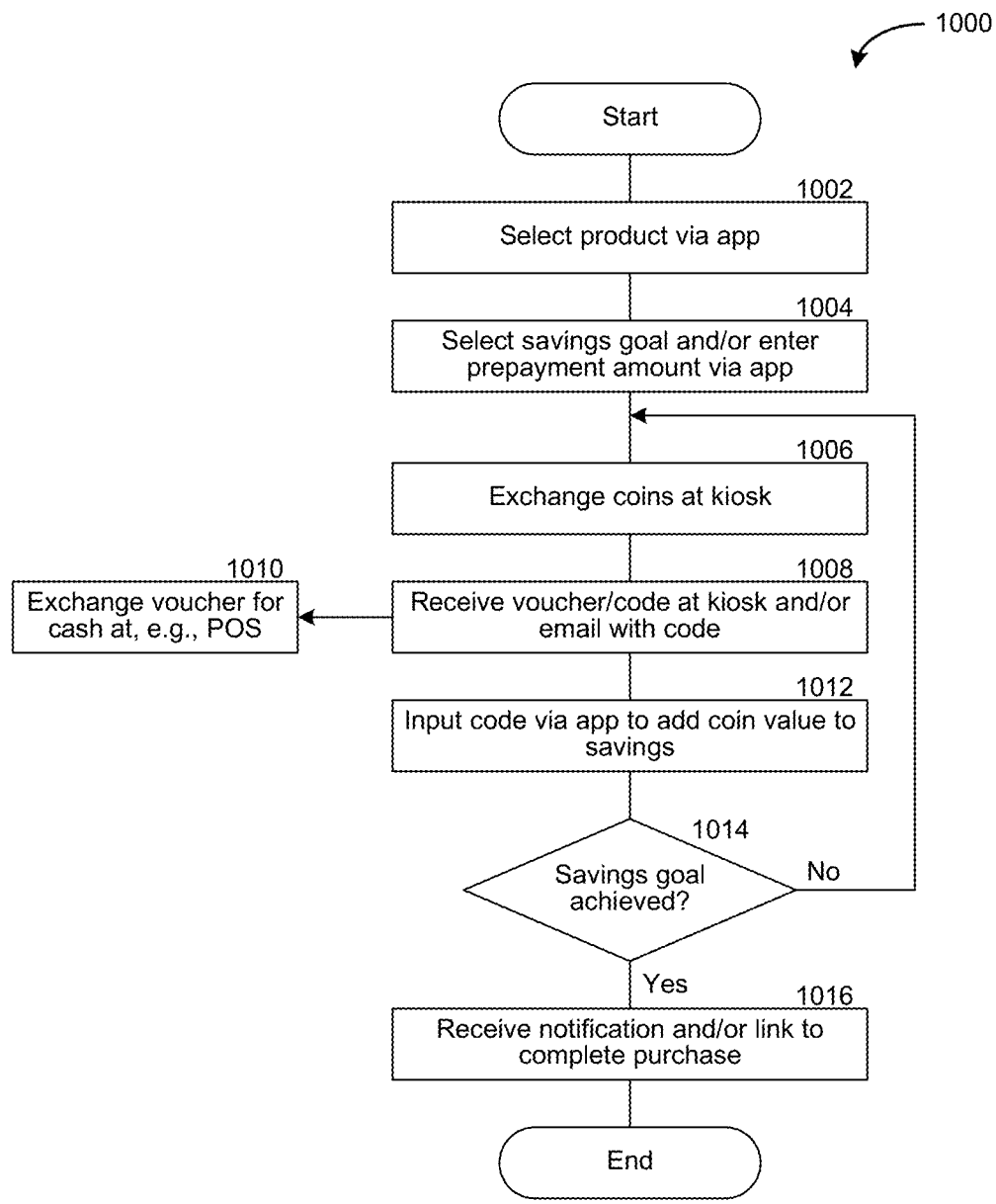
FIG. 10 is a flow diagram of a routine for selecting a product and setting an associated savings goal in accordance with an embodiment of the present technology.

FIG. 10 is a flow diagram of a routine 1000 that can be performed by a user or users to implement a savings program in accordance with the present technology. The routine 1000 is described below with reference to a user, with the understanding that the user may be a single user (e.g., a parent or a child) or two or more users (e.g., a parent and a child) performing different steps or portions of different steps. In block 1002, the user selects a product as a savings "reward". For example, as described above, in some embodiments the user can download an application (e.g., a free application, such as a free mobile app) to his or her device (e.g., the mobile device 104 or the user computer 122; FIG. 1), and select a desired product as a reward. The display page 700a described above with reference to FIG. 7A, for example, provides an example display page that can be implemented to facilitate a product selection by the user. In block 1004, the user selects or sets a savings goal to apply toward the product purchase. By way of example, the display page 700b described above with reference to FIG. 7B illustrates an example of a display page that can be implemented to set a savings goal. Additionally, in some embodiments, the user (e.g., a parent) may elect to prepay a portion of the product purchase price. For example, the display page can include a link to an online retailer website to enable a parent to prepay the purchase price balance (e.g., the purchase price minus the savings goal) up front (i.e., before the child has achieved the savings goal) via payment by a credit or a debit card.

In block 1006, after the user (e.g., the child) has saved some coins, the user can take the coins to a nearby coin counting kiosk 102 and exchange the coins as described above with reference to FIG. 2. In some embodiments, the kiosk 102 can present the display page 800 described above with reference to FIG. 8 during or at the conclusion of the coin exchange process. As noted in block 1008, the user can also receive a unique code at the kiosk (via, e.g., the display screen 231) and/or via an electronic communication (e.g., an email) at the conclusion of the coin counting transaction. As described above and in greater detail below, the unique code enables the user to update and track his or her coin savings. If the user elects to receive a redeemable cash voucher in return for the exchanged coins, the kiosk 102 can dispense the voucher to the user with the code printed on the voucher. In block 1010, the user may elect to exchange the voucher for cash at, e.g., a nearby point of sale (POS). In some embodiments, the voucher has a redeemable cash value that is less than the total value of the coins exchanged during the transaction. For example, the voucher value may be equal to the total coin value minus a service fee. In some embodiments, the user can receive various other forms of value or remuneration from the kiosk 102 in exchange for coins. For example, the user may receive an e-certificate for purchasing items online from various retailers, a money transfer, a gift card or a reload of gift card value, a donation to charity, etc. Some or all of these other forms of remuneration (e.g., an e-certificate) may not have an associated service. In the instance where the user exchanges the voucher for cash, the user may elect to save the cash in the coin savings container 500 described above with reference to FIGS. 6A and 6B.

In block 1012, after returning home from the kiosk 102, the user can input the unique code via the application to add the exchanged coin value to his or her total savings. In some embodiments, for example, the application can provide the display page 900a described above with reference to FIG. 9A for the user to input the unique code and see their total savings. In decision block 1014, if the total savings is short of the goal, the user (e.g., the child) continues to save his or her coins before returning to block 1006 and repeating the coin exchange process. Conversely, if the total savings reaches or exceeds the goal, the user will receive a notification (e.g., an email or other electronic notification) notifying the user that the goal has been achieved, as noted in block 1016. For example, the user may receive a notification such as the display page 900b described above with reference to FIG. 9B. Additionally, the notification can include a link to the appropriate retailer's website so that the user (e.g., the parent) can purchase the selected product for, e.g., the child as a reward for having achieved the savings goal. After block 1016, the routine ends.

Figures 11, 12A:
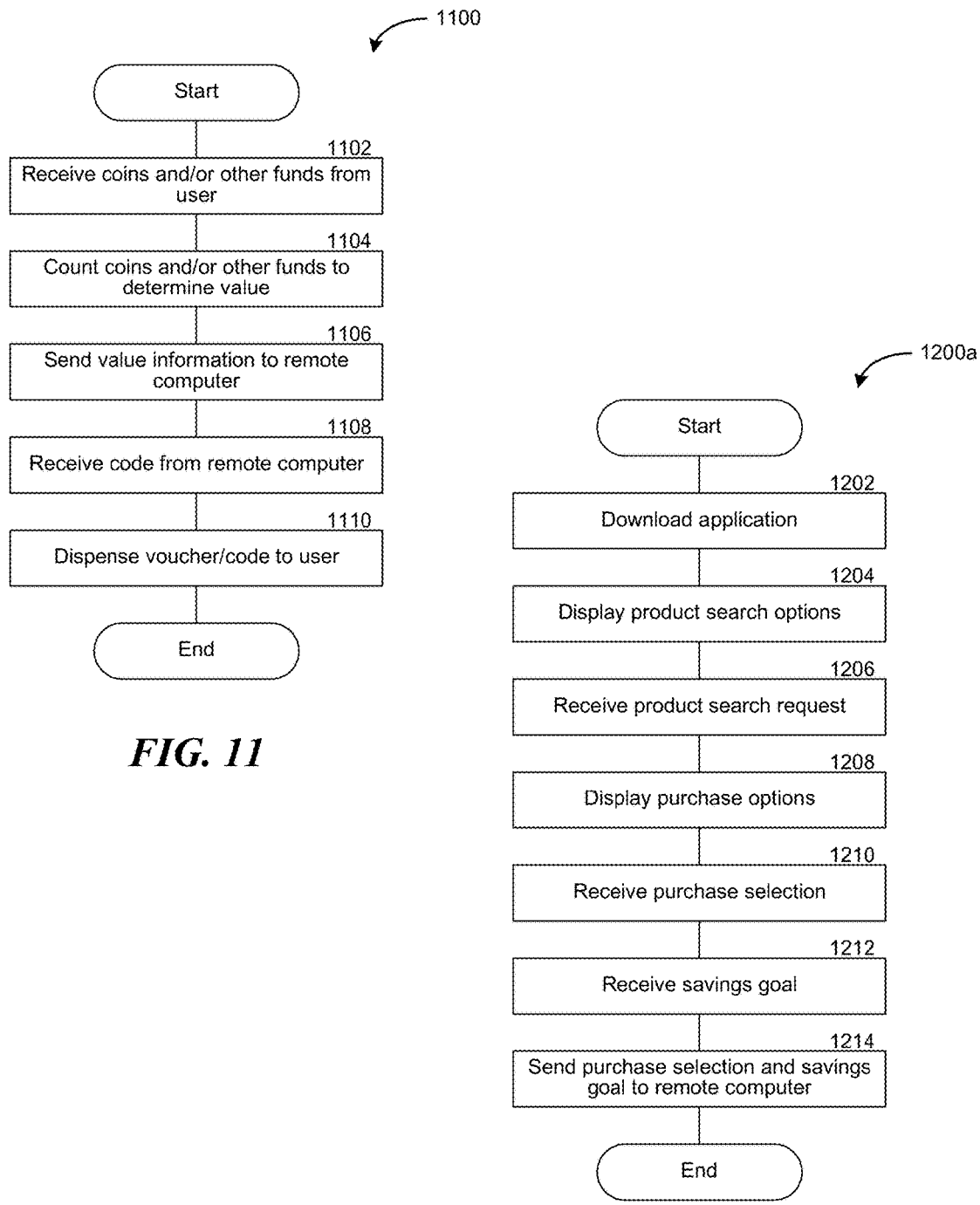
FIG. 11 is a flow diagram of a routine for exchanging saved coins for, e.g., a redeemable cash voucher in accordance with an embodiment of the present technology.
FIG. 12A is a flow diagram of a routine for receiving a purchase selection and an associated savings goal from a user.

FIG. 11 is a flow diagram of a routine 1100 that can be performed by the coin counting kiosk 102 to implement portions of the disclosed technology. In block 1102, the routine receives coins and/or other funds from a user (via, e.g., the coin receiving portion 234 of the kiosk 102; FIG. 2). As described above, in some embodiments the user can be the child who saved the coins, or the child's parent who takes the coins to the kiosk 102. In some embodiments, the user may also wish to input additional funds, such as cash, credit, debit, etc., to, e.g., supplement the child's savings. In block 1104, the routine counts the coins and/or other funds to determine the total value of the deposited coins/funds. In block 1106, the routine sends value information to a remote computer. For example, if the user is only exchanging coins at the kiosk, after the coins have been counted, the kiosk can send the total value of the counted coins to, for example, the kiosk server 106. The total coin value can be associated with a unique code at the kiosk server 106 and stored in an associated database, such as the database 108. In block 1108, the routine receives the unique code from the remote computer. In block 1110, the routine dispenses or otherwise provides the code to the user. For example, the user may elect to receive a redeemable cash voucher in exchange for the coins, and the voucher can be dispensed from the kiosk with the code printed on the voucher. In other embodiments, the kiosk can display the unique code to the user via the kiosk display screen 231 and/or the unique code can be emailed to the user. After block 1110, the routine ends.

Figure 12B:
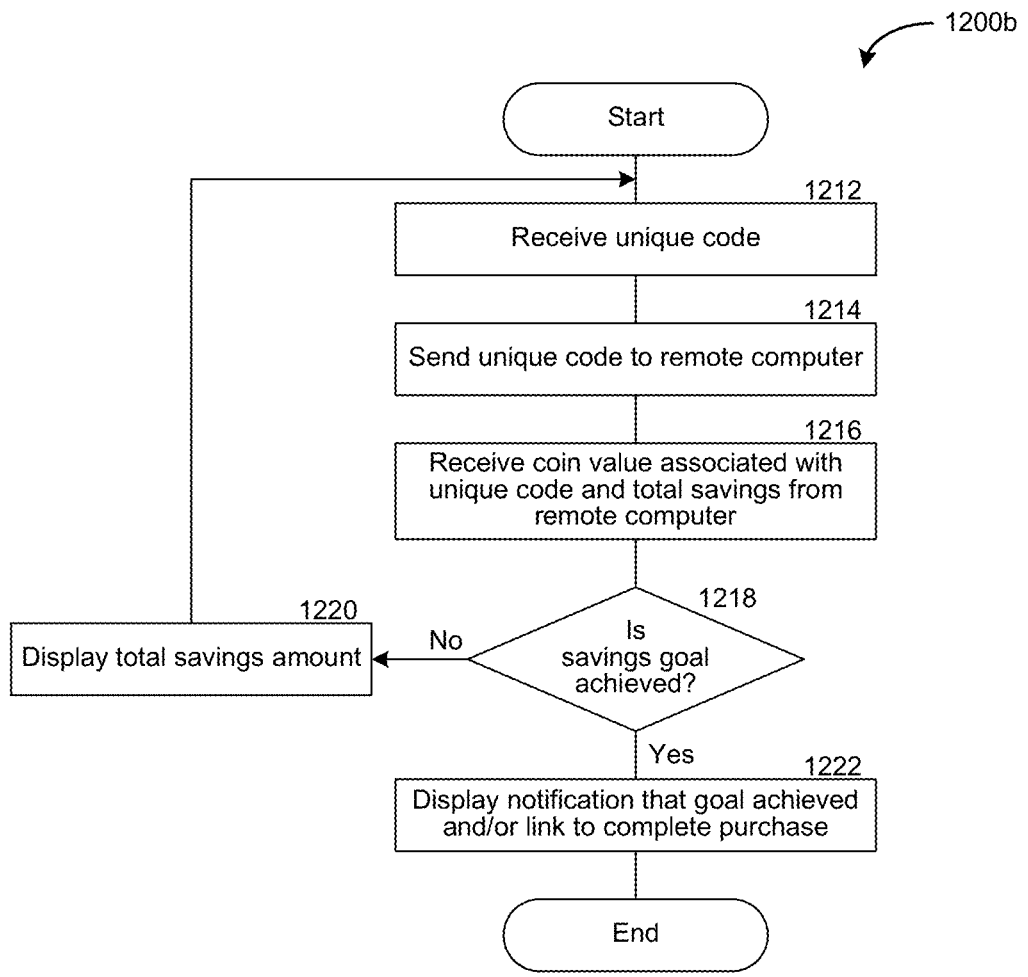
FIG. 12B is a flow diagram of a routine for providing savings information, in accordance with an embodiment of the present technology.

FIGS. 12A and 12B are flow diagrams of routines 1200a and 1200b, respectively, that can be executed by a user device (e.g., the mobile device 104 or the user computer 122) to implement portions of the disclosed technology. For example, although the routines 1200a and 1200b may be described below in the context of the mobile device 104, those of ordinary skill in the art will appreciate that all or portions of these routines can be provided by an application executing on the user computer 122, the kiosk 102b, and/or other suitable computing devices. Referring first to FIG. 12A, in block 1202 the routine downloads the application onto, e.g. the mobile device 104. In bolock 1204, the routine displays product search menus and other search tools to the user via, e.g., the device display 330. In block 1206, the routing receives product search requests from the user, such as product category selections, price ranges, etc. In block 1208, the routine displays product purchase options that meet the user's search criteria. For example, the various purchase options can be displayed via the display page 700a and/or other similar display pages as described above with reference to FIG. 7A. In block 1210, the routine receives a product selection (e.g., a selection of a "reward") from the user. In block 1212, the routine receives a savings goal from the user. For example, the user can input a selected savings goal using the display page 700b and/or a similar display page as described above with reference to FIG. 7B. In block 1214, the routine sends the product selection and the savings goal to a remote computer (e.g., the kiosk server 106) for storing in an associated database. Additionally, the routine can also obtain various user account information (e.g., name, email, password, etc.) and send this information to the remote computer for association with the product selection and savings goal.

Referring next to FIG. 12B, in block 1212 the routine receives a unique code from the user. As described in detail above, the unique code is associated with the total value of a batch of coins (e.g., a "coin pour") that the user exchanged at one of the coin counting kiosks 102. The unique code can be printed on a voucher dispensed to the user at the conclusion of the coin counting transaction, and/or the unique code can be emailed to the user. In some embodiments, the display page 900*a* described above with reference to FIG. 9A can be used to receive the unique code from the user. In block 1214, the routine sends the unique code to a remote computer (e.g., the kiosk server 106). In block 1216, in response to sending the unique code, the routine receives the coin value associated with the corresponding coin exchange transaction from the remote computer. Additionally, the routine can also receive the user's total coin savings to date (i.e., the value from the recent coin exchange transaction plus any previous coin exchanges). For example, if the user has only exchanged a single batch of coins at the kiosk 102 to apply toward his/her savings, the total savings value will be equal to the total value of the coins in the first batch. Conversely, if the user has exchanged other batches of coins to apply toward the savings, the total savings value received from the remote computer will be equal to the pre-existing savings plus the additional new savings from the recent coin pour.

In decision block 1218, the routine determines if the user has reached the savings goal. If not, the routine proceeds to block 1220 and displays the value of the recent coin exchange transaction and the savings total, and then returns to block 1212 and repeats after the user has saved and exchanged additional coins. In some embodiments, the routine can present the display page 900*a* described above with reference to FIG. 9A to display the current total savings amount to the user. When the user achieves the savings goal, the routine proceeds to block 1222 and displays a notification that the goal has been achieved. For example, the routine can present the display page 900*b* described above with reference to FIG. 9B to notify the user that he or she has achieved the savings goal. As noted above, the display page can also include other information, such as the total amount saved, the total item purchase price, as well as, in some embodiments, a link which the user (e.g., the parent) can select to purchase the selected product for the child's reward. After block 1222, the routine ends.

Figure 13:
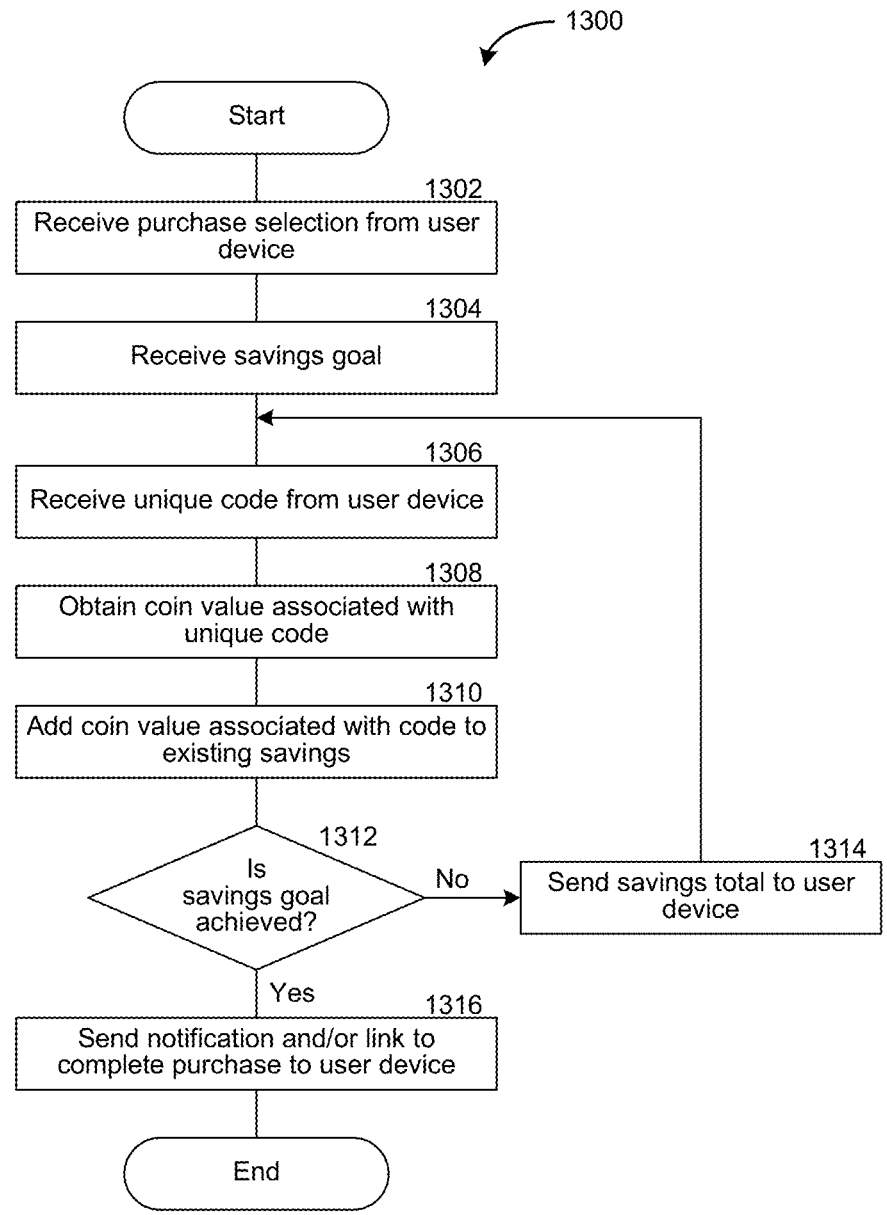
FIG. 13 is a flow diagram of a routine for tracking a savings goal in accordance with another embodiment of the present technology.

FIG. 13 is a flow diagram of a routine 1400 that can be performed by one or more computers remote from a user device (e.g., the mobile device 104, the user computer 122, etc.) and the coin counting kiosks 102. For example, in some embodiments the routine 1300 can be performed by one or more remote server computers, such as the kiosk server 106 and/or an associated server computer. In block 1302, the routine receives a product purchase selection from a user device (e.g., from the mobile device 104). As described above, the purchase selection may be, for example, a product that a child has selected as a "reward" for achieving a savings goal. In block 1304, the routine receives a savings goal from the user device, representing the portion of the purchase price that the child intends to save in order to receive the reward from his or her parent. The product selection and the savings goal can be saved in an associated database (e.g., the database 108) and associated with user account information. In block 1306, the routine receives a unique code from a user device (and, in some embodiments, user account information), which may be the same user device that performed blocks 1302 and 1304 (e.g., the mobile device 104) or another user device. Additionally, it should be understood that the routine may receive the unique code after a period of time has passed in which the user has saved a batch of coins and then exchanged them at a coin counting kiosk in order to receive the unique code. In block 1308, the routine obtains a coin value associated with the unique code. For example, in some embodiments the coin value is equivalent to the total value of the coins the user exchanged at the kiosk 102 in the coin exchange transaction associated with the code. The routine can retrieve this coin value from a database (e.g., the database 108) associated with the remote computer. In block 1310, the routine adds the coin value associated with the unique code to any existing savings the user has accumulated in his or her user account to determine the current total savings. In decision block 1312, the routine determines if the user has achieved the savings goal. If not, the routine proceeds to block 1314 and sends the coin value associated with the unique code and the total savings to the user device, and then returns to block 1306 and repeats. The user device can display the current savings total and other information by, for example, presenting the display page 900*a* described above with reference to FIG. 9A. If the savings goal is achieved, the routine proceeds to block 1316 and sends a notification to the user device indicating that the goal has been reached. The user device can display such notification by, for example, presenting the display page 900*b* described above with reference to FIG. 9B. Additionally, the notification can also include a link to an online retailer website that the user can electronically access to complete the purchase of the selected reward. After block 1316, the routine ends.

Although the foregoing methods and systems have been described in the context of a savings application configured to encourage and facilitate saving money by children, those of ordinary skill in the art will appreciate the other embodiments of the disclosed technology can be implemented by adults and other users to purchase selected products. For example, an adult or other consumer can utilize the disclosed technology to select a desired product for purchase (e.g., at a discounted price). As the consumer exchanges their accumulated coins over time using one or more of the coin counting kiosks 102, the accumulated value of the coin deposits can be stored in a remote database and associated with a unique code. Once the user has saved a sufficient amount of funds to purchase the selected product, the system can provide an email or other notification to the user indicating that a sufficient amount of funds have been saved to enable the user to purchase the desired product. Additionally, the user can be provided with a link to the appropriate retailer website to enable the user to purchase the selected product with the saved funds.

FIGS. 10-13 are representative flow diagrams that depict processes used in some embodiments. These flow diagrams do not show all functions or exchanges of data, but instead they provide an understanding of commands and data exchanged under the system. Those skilled in the relevant art will recognize that some functions or exchange of commands and data may be repeated, varied, omitted, or supplemented, and other (less important) aspects not shown may be readily implemented. Each of the steps depicted in FIGS. 10-13 and the other flow diagrams can itself include a sequence of operations that need not be described herein. Those or ordinary skill in the art can create source code, microcode, program logic arrays or otherwise implement the invention based on these flow diagrams and the detailed description provided herein.

The flow diagrams described herein are representative flow diagrams that depict routines and processes used in some embodiments. These processes and routines can be executed by a processing device, such as a processor or CPU associated with the mobile device 104, the user computer 122, kiosk 102, the kiosk server 106, the retailer server 116, an associated server computer, wireless device, personal computer, etc. in accordance with computer-executable instructions stored on a computer-readable medium. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like, are generally used interchangeably herein and refer to any of the above devices and systems, as well as any data processor. These flow diagrams may not show all functions or exchanges of data, but instead they provide an understanding of commands and data exchanged under the system. Those skilled in the relevant art will recognize that some functions or exchange of commands and data may be repeated, varied, omitted, or supplemented, and other (less important) aspects not shown may be readily implemented. For example, while processes or blocks are presented in a given order, alternative implementations may perform routines having steps, or employ systems having blocks in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Various steps depicted in the flow diagrams can be of a type well known in the art and can itself include a sequence of operations that need not be described herein. Those of ordinary skill in the art can create source code, microcode, program logic arrays or otherwise implement the inventions described herein based on the Figures and the detailed description provided herein. The routines described above can be stored in non-volatile memory, or in removable media, such as disks, or hardwired or preprogrammed in chips, such as EEPROM semiconductor chips.

Those of ordinary skill in the art will appreciate that the routines and other functions and methods described herein can be implemented as an application specific integrated circuit (ASIC), by a digital signal processing (DSP) integrated circuit, through conventional programmed logic arrays or circuit elements. While many of the embodiments are shown and described as being implemented in hardware (e.g., one or more integrated circuits designed specifically for a task), such embodiments could equally be implemented in software and be performed by one or more processors. Such software can be stored on any suitable computer-readable medium, such as microcode stored in a semiconductor chip, on a computer-readable disk, or downloaded from a server and stored locally at a client.

At least one server computer, coupled to the Internet or World Wide Web ("Web") or other network, performs much or all of the functions for receiving, routing and storing of electronic messages, such as web pages, audio signals and electronic images as described herein. The network may have a client-server architecture, in which a computer is dedicated to serving other client computers, or it may have other architectures such as a peer-to-peer, in which one or more computers serve simultaneously as servers and clients.

A database or databases, coupled to the server computer(s), stores much of the web pages and content exchanged between the user computers. The server computer(s), including the database(s), may employ security measures to inhibit malicious attacks on the system, and to preserve integrity of the messages and data stored therein (e.g., firewall systems, secure socket layers (SSL) password protection schemes, encryption, and the like).

The server computers described herein may include a server engine, a web page management component, a content management component, and a database management component. The server engine performs basic processing and operating system level tasks. The web page management component handles creation and display or routing of web pages. Users may access the server computer by means of a URL associated therewith. The content management component handles most of the functions in the embodiments described herein. The database management component includes storage and retrieval tasks with respect to the database, queries to the database, and storage of data such as animation graphics and audio signals.

To provide for interaction with a user, embodiments of the subject matter described in this specification can be implemented on a computing device having an interface. An interface can be a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Also, devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

In general, the detailed description of embodiments of the described technology is not intended to be exhaustive or to limit the technology to the precise form disclosed above. While specific embodiments of, and examples for, the technology are described above for illustrative purposes, various equivalent modifications are possible within the scope of the described technology, as those skilled in the relevant art will recognize. For example, while processes, blocks, and/or components are presented in a given order, alternative embodiments may perform routines having steps, or employ systems having blocks, in a different order, and some processes or blocks may be deleted, moved, added, subdivided, combined, and/or modified. Each of these processes, blocks, and/or components may be implemented in a variety of different ways. Also, while processes, blocks, and/or components are at times shown as being performed in series, these processes, blocks, and/or components may instead be performed in parallel, or may be performed at different times.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A method comprising:
receiving, by a coin receiving region of a coin counting kiosk, a plurality of random coins from a user for a coin exchange transaction;
counting, by a coin discriminator of the coin counting kiosk the plurality of random coins to determine a total coin value;
providing the user with a unique code, wherein the unique code is stored in a remote database and associated with the total coin value; and
providing a non-transitory computer-readable medium configured to cause a processor of a user device to:
 display one or more items available for purchase and a corresponding purchase price for each of the items;
 receive a selection of one of the items from the user;
 receive a savings goal from the user, wherein the savings goal is associated with the selected item and is less than the purchase price of the selected item;
 receive the unique code from the user;
 send the unique code to the remote database;
 in response to sending the unique code, receive the coin value from the remote database;
 display the coin value and at least one of the savings goal or the purchase price; and
 when a sum of the coin value plus any additional values associated with any additional unique codes received from the user is greater than or equal to the savings goal, display a message indicating that the savings goal has been met.

2. The method of claim 1, wherein the computer-readable medium is further configured to cause the processor of the user device to:
individually receive an additional one or more unique codes from the user,
individually send each of the additional unique codes to the remote database;
in response to individually sending each of the additional unique codes, individually receive corresponding additional coin values from the remote database; and
display a total amount saved to the user, wherein the total amount saved is equal to a sum of the first coin value plus the additional coin values,
wherein the unique code is a first unique code, wherein the coin exchange transaction is a first coin exchange transaction,
wherein the coin value is a first coin value,
wherein each of the additional unique codes is associated with a corresponding additional coin exchange transaction conducted at one of a plurality of consumer operated coin counting kiosks, and
wherein each of the additional coin exchange transactions included counting a plurality of coins to determine an additional coin value.

3. The method of claim 2, wherein the computer-readable medium is further configured to cause the processor of the user device to: when the total amount saved is greater than or equal to the savings goal, display a link to a webpage associated with the selected item, wherein the webpage facilitates purchasing the item online.

4. The method of claim 1, wherein the method is configured to encourage children to save coins and/or bills, wherein displaying one or more items includes displaying a plurality of child appropriate products for purchase, and wherein receiving a savings goal includes receiving a savings goal that represents a dollar amount saved by a child to apply toward to the purchase price of the selected product.

5. The method of claim 1 wherein the total coin value is equal to 100% of a value of the coins exchanged in the coin exchange transaction.

6. The method of claim 1 wherein the total coin value is equal to 100% of a value of the coins exchanged at the one consumer operated coin counting kiosk in the coin exchange transaction; and wherein the voucher is also redeemable for at least one of cash and merchandize at a point of sale for less than 100% of the value of the coins exchanged in the coin exchange transaction.

7. The method of claim 1 wherein the computer-readable medium is further configured to cause the processor of the user device to: receive a product search query from the user, wherein displaying one or more items available for purchase includes displaying content from a third party online retailer in response to the search query.

8. The method of claim 1 wherein the computer-readable medium is further configured to cause the processor of the user device to: receive a product search query from the user, wherein displaying one or more items available for purchase includes displaying a plurality of child appropriate products from a third party online retailer in response to the search query.

9. The method of claim 1 wherein the computer-readable medium is further configured to cause the processor of the user device to: receive electronic payment of a prepayment amount from the user, wherein a sum of the prepayment amount and the savings goal is equal to the purchase price of the selected item.

10. A networked computer system configured to facilitate saving money for purchase of a selected product, the networked computer system comprising:

a coin counting kiosk comprising:
  a coin receiving region configured to receive a plurality of random coins from a user;
  a coin discriminator;
  a first processor; and
  a first memory storing instructions to be executed by the first processor to:
   cause the coin discriminator to count the plurality of random coins to determine a total coin value; and
   cause the coin counting kiosk to provide the user with a unique code, wherein the unique code is stored in a remote database and associated with the total coin value, and
 a server configured to provide a user device with computer-readable instructions, wherein the user device includes a second processor configured to execute the computer-readable instructions to:
  receive a product selection, the product selection having a purchase price;
  receive a savings goal, wherein the savings goal is a dollar amount that is less than the purchase price;
  receive the unique code;
  in response to receiving the unique code, obtain and receive the total coin value from the remote database; and
  when a sum of the total coin value plus any additional values associated with any additional unique codes received from the user is greater than or equal to the savings goal, display a message indicating that the savings goal has been met.

11. The networked computer system of claim 10, wherein the total coin value is equal to 100% of a total value of the plurality of coins exchanged at the coin counting kiosk.

* * * * *